US007633926B1

(12) United States Patent
Sethi et al.

(10) Patent No.: US 7,633,926 B1
(45) Date of Patent: Dec. 15, 2009

(54) EXTENDING MULTICAST APPLICATIONS AVAILABLE ON DATA NETWORKS TO CELL-BASED WIRELESS NETWORKS

(75) Inventors: Aseem Sethi, Bangalore (IN); Tanuka Dutta, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1465 days.

(21) Appl. No.: 10/359,187

(22) Filed: Feb. 6, 2003

(51) Int. Cl.
*H04J 3/24* (2006.01)

(52) U.S. Cl. .................... 370/349; 370/390; 370/312; 370/342; 370/353; 370/341; 370/401; 370/389; 455/503; 455/414.1; 709/204

(58) Field of Classification Search ............... 370/349, 370/390, 312, 389, 352, 353, 341, 320, 342, 370/338, 401; 455/503, 414.1; 709/204
See application file for complete search history.

(56) References Cited

U.S. PATENT DOCUMENTS

| | | | | |
|---|---|---|---|---|
| 5,457,680 A * | 10/1995 | Kamm et al. | ............... | 370/332 |
| 5,928,331 A * | 7/1999 | Bushmitch | ............... | 709/231 |
| 6,370,142 B1 * | 4/2002 | Pitcher et al. | ............... | 370/390 |
| 6,463,055 B1 * | 10/2002 | Lupien et al. | ............... | 370/353 |
| 6,477,149 B1 * | 11/2002 | Okanoue | ............... | 370/312 |
| 6,529,497 B1 * | 3/2003 | Hjelm et al. | ............... | 370/347 |
| 6,633,765 B1 * | 10/2003 | Maggenti | ............... | 455/503 |
| 6,684,081 B2 * | 1/2004 | Sarkkinen et al. | ............... | 455/515 |
| 6,711,147 B1 * | 3/2004 | Barnes et al. | ............... | 370/338 |
| 6,747,989 B1 * | 6/2004 | Sevanto | ............... | 370/466 |
| 6,804,528 B1 * | 10/2004 | Laroia et al. | ............... | 455/503 |
| 6,839,565 B2 * | 1/2005 | Sarkkinen et al. | ............... | 455/503 |
| 6,876,636 B2 * | 4/2005 | Sinnarajah et al. | ............... | 370/312 |
| 6,901,058 B2 * | 5/2005 | Lalwaney | ............... | 370/320 |
| 6,959,009 B2 * | 10/2005 | Asokan et al. | ............... | 370/475 |
| 6,961,349 B2 * | 11/2005 | Malomsoky et al. | ............... | 370/469 |
| 6,961,571 B1 * | 11/2005 | Rune et al. | ............... | 455/442 |
| 6,970,449 B1 * | 11/2005 | Smith et al. | ............... | 370/349 |
| 6,980,801 B1 * | 12/2005 | Soininen et al. | ............... | 455/435.1 |
| 7,016,347 B2 * | 3/2006 | De Oliveira | ............... | 370/389 |
| 7,027,582 B2 * | 4/2006 | Khello et al. | ............... | 379/220.01 |
| 7,054,268 B1 * | 5/2006 | Parantainen et al. | ............... | 370/231 |
| 7,054,297 B1 * | 5/2006 | Smith | ............... | 370/338 |
| 7,054,902 B2 * | 5/2006 | Toporek et al. | ............... | 709/203 |
| 7,072,329 B2 * | 7/2006 | Willars et al. | ............... | 370/352 |
| 7,072,656 B2 * | 7/2006 | Willars et al. | ............... | 455/436 |

(Continued)

OTHER PUBLICATIONS

S. Deering; Entitled, Request for Comments:1112—"Host Extensions for IP Multicasting"; Aug. 1989; Available from www.ietf.org; (17 Pages).

(Continued)

*Primary Examiner*—Marceau Milord
(74) *Attorney, Agent, or Firm*—Patent Capital Group

(57) ABSTRACT

A mobile node on a cell-based wireless network (e.g., implemented using GSM) may indicate multicast applications (provided on a data network) of interest and receive data related to the applications. A data switch connected to the data network may receive a list of multicast applications of interest in the entire wireless network, and send data related to only the applications of interest to a gateway. The gateway may interact with a switching center and base station operating in conjunction with wireless network to extend the multicast applications to mobile nodes.

113 Claims, 12 Drawing Sheets

U.S. PATENT DOCUMENTS

| | | | | |
|---|---|---|---|---|
| 7,075,904 | B1* | 7/2006 | Manish et al. | 370/312 |
| 7,082,118 | B1* | 7/2006 | Sethi | 370/349 |
| 7,107,066 | B2* | 9/2006 | Toth et al. | 455/458 |
| 7,222,185 | B1* | 5/2007 | Day | 709/232 |
| 7,254,409 | B2* | 8/2007 | Sato et al. | 455/466 |
| 7,274,943 | B2* | 9/2007 | Trossen | 455/461 |
| 7,286,546 | B2* | 10/2007 | Mondal | 370/401 |
| 7,296,091 | B1* | 11/2007 | Dutta et al. | 709/245 |
| 7,346,023 | B2* | 3/2008 | Chuah | 370/328 |
| 7,454,525 | B1* | 11/2008 | Sethi | 709/245 |

OTHER PUBLICATIONS

George Xylomenos and George C. Polyzos; Entitled,"IP Multicast for Mobile Hosts"; Proceedings of IEEE MILCOM 1996; (7 Pages).

C. Perkins; Entitled,"Request for Comments: 2002—IP Mobility Support"; Oct. 1996; Available from www.ietf.org; (79 Pages).

W. Fenner; Entitled,"Request for Comments: 2236—Internet Group Management Protocol, Version 2"; Nov. 1997; Available from www.ietf.org; (24 Pages).

Neda Nikaein, Christian Bonnet; Entitled,"Wireless Multicasting in an IP Environment",, Proceedings of 5 th Intl. Workshop on Mobile Multimedia Communication MoMuc'98, Oct. 12-14 1998, Berlin; (6 Pages).

3GPP TS 23.060 V3.8.0 (Jun. 2006); 3rd Generation Partnership Project; Technical Specification Group Services and System Aspects; General Packet Radio Service (GPRS); Service description; Stage 2; (Release 1999); (189 Pages).

3GPP TS 29.018 V4.2.0 (Dec. 2001); 3rd Generation Partnership Project; Technical Specification Group Core Network; General Packet Radio Service (GPRS); Serving GPRS Support Node (SGSN)—Visitors Location Register (VLR); Gs interface layer 3 specification (Release 4); (57 Pages).

* cited by examiner

EXTENDING MULTICAST APPLICATIONS AVAILABLE ON DATA NETWORKS TO CELL-BASED WIRELESS NETWORKS

BACKGROUND OF THE INVENTION

1. Field of the Invention

The present invention relates to cell-based wireless networks (such as those based on GSM), and more specifically to a method and apparatus for extending multicast applications available on data networks (e.g., Internet Protocol based networks) to such wireless networks.

2. Related Art

Multicasting generally refers to sending data from one entity (machine, application, etc.) to only some of the pre-specified entities ("end entities") in a networked environment. Multicasting is used to implement several applications ("multicast applications") such as network-based broadcasting (to several machines/users), movies, video conferencing, etc.

Data networks have been implemented to support multicast applications. For example, IGMP (Internet group management protocol) defines a standard by which a router-type device may indicate the specific class-D addresses (with each class-D address typically providing a multicast application) of interest to one or more IP (Internet Protocol) machines on a network the router is also connected to.

The data related to such class-D addresses (indicated using IGMP) may be made available to a router, which in turn makes the data available to the machines forming the end machines of the corresponding multicast application. Thus, the end machines receive the data corresponding to the multicast applications of interest. IGMP is described in further detail in a document entitled, "RFC 2236: Internet Group Management Protocol, Version 2", by W. Fenner, Dated November 1997, available from www.ietf.org, which is incorporated in its entirety herewith.

Cell-based wireless networks have evolved in parallel, initially to allow voice communications (akin to telephone calls). A cell-based wireless generally contains several transceiver stations, with each transceiver enabling mobile nodes (e.g., cell phones) to send and receive voice information. The signals within the cell-based wireless networks are used as a basis for enabling voice communications. GSM (Global System for Mobile Communication) is an example standard which allows such connectivity to mobile nodes. GSM is described in further detail in a book entitled, "The GSM System for Mobile communications", by M. MOULY and M. B. PAUTET, ISBN 2-9507190-0-7, which is incorporated in its entirety herewith.

Solutions have been implemented to provide connectivity between mobile nodes and machines in data networks. For example, in GSM environment, devices commonly referred to as SGSN (Serving GPRS Support Node) and GGSN (Gateway GPRS Support Node) are employed to provide such connectivity. The corresponding solution is described in a document entitled, "3GPP TS 29.018 V4.2.0 (2001-12); 3rd Generation Partnership Project; Technical Specification Core Group Network; General Packet Radio Service (GPRS); Serving GPRS Support Node (SGSN)—Visitors Location Register (VLR); Gs interface layer 3 specification (Release 4)", (hereafter "GPRS Document") available from 3GPP support office address, 650 Route des Lucioles—Sophia Antipolis, Valbonne—FRANC3E, Tel.: +33 4 92 94 42 00 (ftp://ftp.3gpp.org/Specs/), which is also incorporated in its entirety herewith.

It may be desirable to extend multicast applications to mobile nodes such that users using mobile nodes can access applications such as video broadcasts. In one approach, multiple copies of data, related to a multicast application may be transmitted, with each copy being sent to a corresponding mobile node. In general, the use of such multiple copies may create an undesirable level of overhead (e.g., in terms of bandwidth requirement, processing requirements in various components).

SUMMARY OF THE INVENTION

According an aspect of the present invention, a mobile node of a cell-based wireless network sends data indicating multicast applications (originating in data networks) of interest, and receives data corresponding to the multicast applications. As a result, the multicast applications can be extended to mobile nodes in cell-based wireless networks.

According to another aspect of the present invention, a gateway (e.g., SGSN in GSM environment) determines a list of multicast applications of interest to mobile nodes in cell-based wireless networks, and sends the list to a data switch (e.g., GGSN in GSM environment). The data switch forwards data related to such multicast applications to the gateway, which in turn forwards the data to mobile nodes using, for example, BSS (base station system) and switching center in a GSM environment.

According to one more aspect of the present invention, a gateway determines the list of multicast applications of interest in response to receiving (from a data switch) notification of availability of multicasting service. In an embodiment, the gateway interfaces with a switching center to cause a base station to generate a membership query request to be broadcast on a cell-based wireless network. In response to the membership query request, each mobile nodes may communicate a corresponding list of multicast applications of interest to the gateway.

According to yet another aspect of the present invention, a gateway generates a unique group identifier associated with each multicast application of interest, and sends back the group identifier when a mobile node indicates interest in the multicast application. The gateway may then cause a base station to indicate a specific data channel ("channel notification") on which data related to the multicast application will be transmitted by sending a combination of the group identifier and the channel identifier on which the data related to the multicast application will be broadcast.

In an embodiment implemented in the context of GSM, the membership query request and the channel notification are sent by broadcasting the appropriate data content on a notification channel (NCH). Once the channel notification is sent, gateway forwards data related a multicast application along with a channel identifier to a base station, and the base station broadcasts the data on the channel with the channel identifier. Due to the channel notification (and since the 'interested mobile nodes' are earlier provided the group identifier), each mobile node may receive data related to multicast application of interest.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

Figure (FIG.) 1 is a block diagram of a communication system illustrating an example environment in which the present invention can be implemented.

DETAILED DESCRIPTION OF THE PREFERRED EMBODIMENTS

1. Overview

According to an aspect of the present invention, a data switch (e.g., an IP router) receives a list of multicast applications of interest to mobile nodes of a cell-based wireless network. The data switch forwards data related to such multicast applications to a gateway device providing connectivity between data networks and cell-based wireless networks. In an embodiment, the gateway provides such a list after receiving a membership query from the data switch.

According to another aspect of the present invention, a gateway device sends a polling request periodically to mobile nodes requesting the mobile nodes to indicate the specific multicast applications of interest. In response, each mobile node indicates the specific multicast application of interest. The gateway device sends a list of multicast applications of interest based on all such responses.

In an embodiment, each mobile node indicates the specific multicast application of interest by using the corresponding class-D IP network address. To minimize the number of bits transmitted thereafter, a gateway device may map each class-D IP network address to a corresponding group identifier. The group identifier may be communicated immediately when a mobile node communicates interest in the class-D IP network. Data related to each multicast application may thereafter be associated with the corresponding group identifier.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
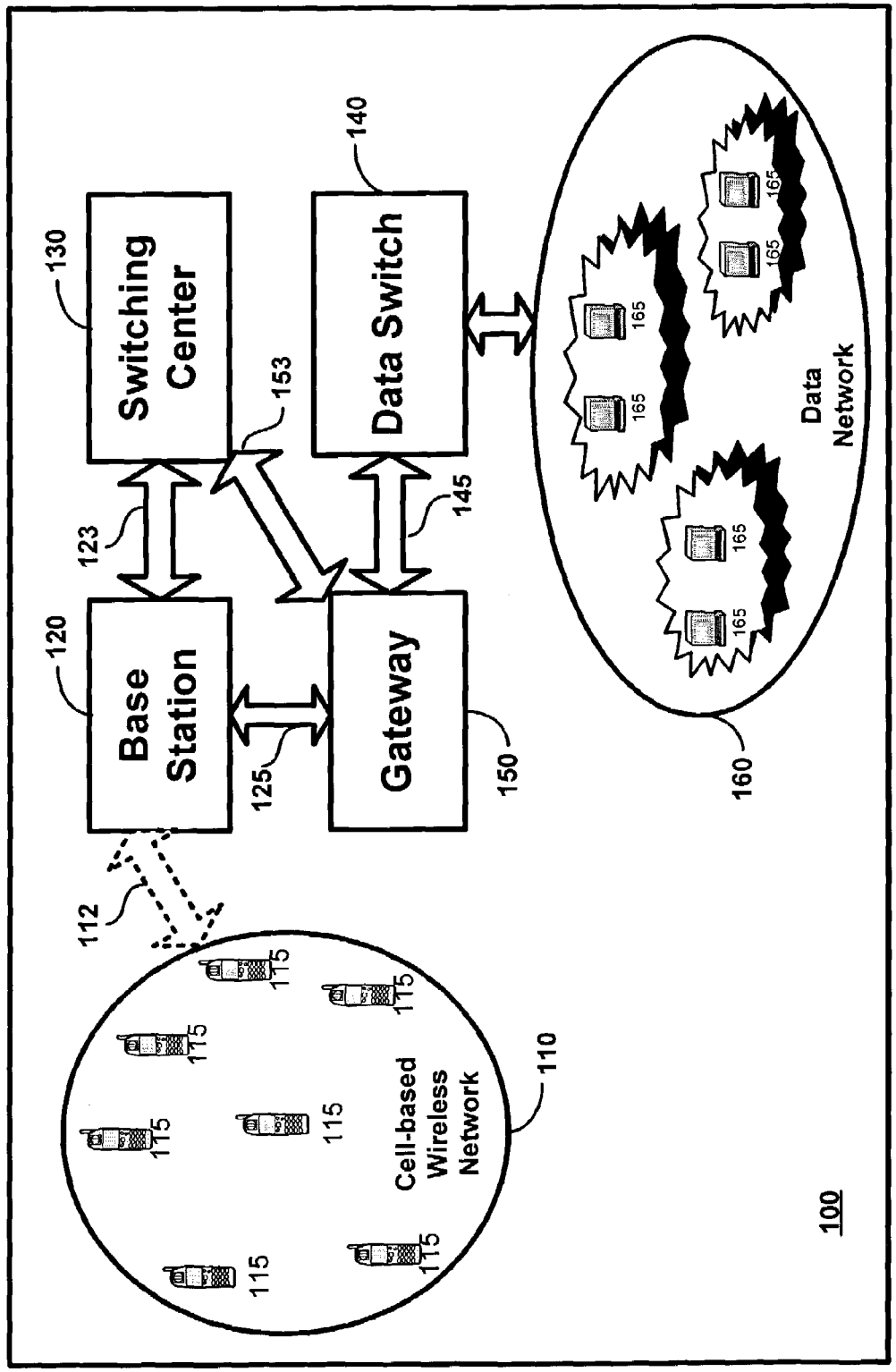

FIG. 1 is a block diagram of communication system 100 illustrating an example environment in which the present invention can be implemented. Communication system 100 is shown containing several components which are commonly found in GSM-based networks, and the description herein is provided with reference to such an example merely for illustration. However, several aspects of the present invention can be implemented in other types of environment (e.g., CDMA), as will be apparent to one skilled in the relevant arts by reading the disclosure provided herein.

Communication system 100 is shown containing cell-based wireless network 110, base station 120, switching center 130, data switch 140, gateway 150, and data network 160. The manner in which these systems together operate to provide unicast (point-to-point) data connections to mobile nodes, and the manner in which data switch 140 may provide multicast applications for end machines of data networks, is described first. The manner in which the systems may be extended to provide multi-cast applications to mobile nodes is described then.

Cell-based wireless network 110 is shown containing several mobile nodes (only some shown as 115), which are generally designed for voice calls using cell-based technologies (e.g., GSM). Mobile nodes 115 may be provided unicast data connectivity using protocols such as GPRS described in further detail in the GPRS document, noted above. The manner in which the operation of mobile nodes 115 can be extended to provide access to multicast applications originating from data networks is described in sections below.

Data network 160 contains several end machines (only some shown as 165, for brevity). Each end machine may either be a source of a multicast application or a leaf (recipient only) of a multicast application. The manner in which end machines may be part of a multicast application is described in further detail in RFC 2236 entitled, "Internet Group Management Protocol, Version 2", and RFC 1112 entitled, "Host Extensions for IP Multicasting", available from www.ietf.com, which are both incorporated in their entirety into the present application herewith.

Data switch 140 provides the necessary connectivity between data network 160 and gateway 150 when unicast data connections are provided to mobile nodes in cell-based wireless network 110. In an embodiment, data switch 140 interfaces with gateway 150 using GTP (GPRS Tunneling Protocol) on path 145 described in further detail in a document entitled, "3GPP TS 29.060 V3.11.0 (2001-12); 3rd Generation Partnership Project; Technical Specification Core Group Network; General Packet Radio Service (GPRS); GPRS Tunneling Protocol (GTP) across the Gn and Gp interface (Release 1999)", and the document is incorporated in its entirety herewith. All the 3GPP documents referred to in the present application are available from available from 3GPP support office address, 650 Route des Lucioles—Sophia Antipolis, Valbonne—FRANC3E, Tel.: +33 4 92 94 42 00 (ftp://ftp.3gpp.org/Specs/).

In addition, data switch 140 communicates with several other data switches (not shown) to determine the presently active multicast applications. The active multicast applications may be determined, for example, using IGMP described in RFC 2236 noted above. End machines 165 may indicate specific multicast applications of interest, and data switch 140 provides the data related to such applications. In an embodiment, data switch 140 is implemented by modifying VXR7200 or 7400 products, available from Cisco Systems Incorporated of San Jose, Calif. (the assignee of the subject patent application).

Gateway 150 interfaces with data switch 140, base station 120 and switching center 130 on paths 145, 125 and 153 respectively, to provide unicast data connectivity for mobile nodes 115. In an embodiment, gateway 150 is implemented according to standard, which is described in further detail in document entitled, "GPP TS 23.060, V5.2.0 (2002-06), 3rd Generation Partnership Project; Technical Specification Group Services and System Aspects; General Packet Radio Service (GPRS), Service Description; Stage 2", which is incorporated in its entirety into the present application. In such an environment, gateway 150 is referred to as a SGSN.

Switching center 130 is generally responsible for setting up, managing, and clearing connections (to mobile nodes) as well as routing the cell data elements to the appropriate cell in cell-based wireless network 110. Switching center 130 may operate consistent with various ITU and ETSI standards described in "The GSM System for Mobile communications", by M. MOULY and M. B. PAUTET, ISBN 2-9507190-0-7, which is incorporated in its entirety herewith. In such an environment, switching center 130 is referred to as a mobile switching center.

Base station 120 operates to transmit/receive packets on connections setup (operating in conjunction with switching center 130) to/from mobile nodes. The packets related to unicast data connections may be forwarded to gateway 150, and packets related to voice calls or control operations (such as for setting up a channel) may be forwarded to switching center 130. Base station 120 may operate consistent with ITU and ETSI standards noted above. In such an environment, base station 120 is referred to as a base station system (BSS).

The manner in which multicast applications provided by data networks may be extended to cell-based wireless networks according to various aspects of the present invention is described below in further detail. The description is provided with reference to operation of each system for understandability.

3. Operation of Data Switch

Figure 2:
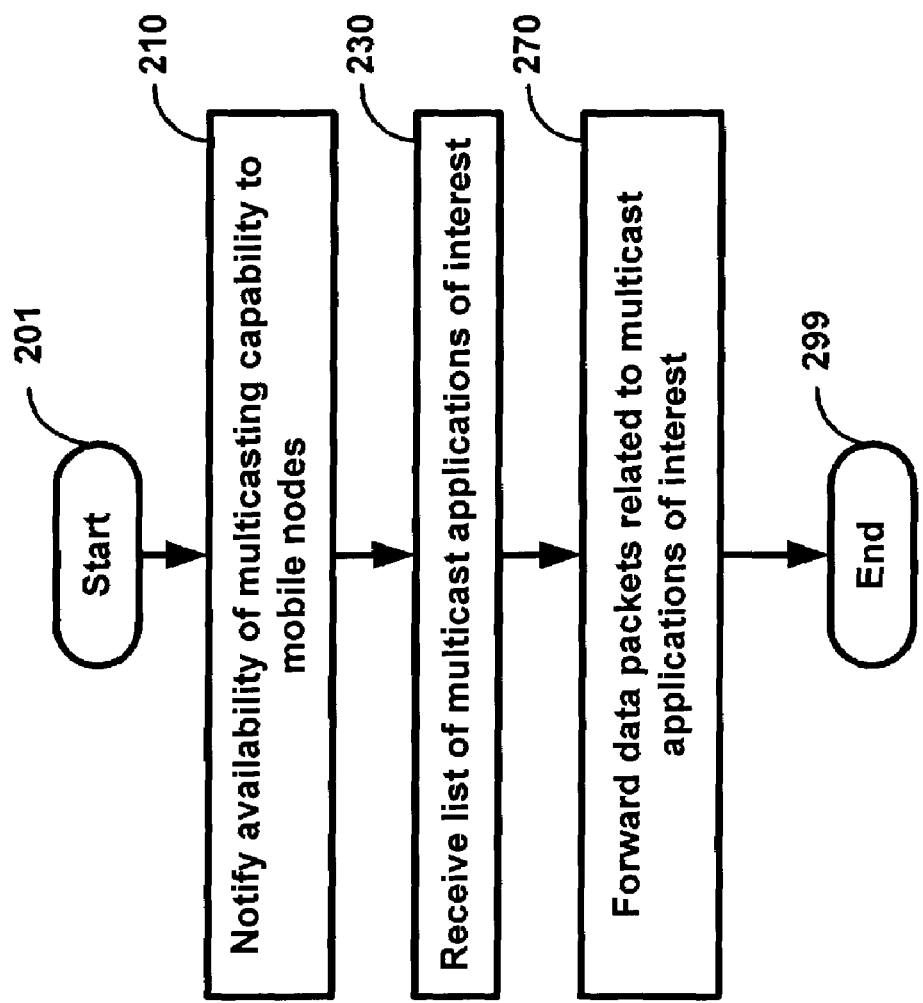
FIG. 2 is a flowchart illustrating the operation of a data switch in an embodiment of the present invention.

FIG. 2 is a flow chart illustrating a method using which a data switch may enable multicast applications to be extended to mobile nodes. The description is provided with reference to FIG. 1 for illustration. However, the method can be implemented in several other environments as well, as will be apparent to one skilled in the relevant arts by reading the disclosure provided herein. The implementations in such alternative embodiments are contemplated to be within the scope and spirit of various aspects of the present invention.

The method of FIG. 2 begins in step 201, in which control passes to step 210. In step 210, data switch 140 notifies gateway 150 of the capability to extend multicast applications to cell-based wireless network 110. Various packet formats and/or protocols may be used to provide such a notification. Example packet format in GSM environments is described in a section below.

In step 230, data switch 140 receives from gateway 150 a list of multicast applications of interest (to mobile nodes 115). In an embodiment, each multicast application is specified by a corresponding class-D IP network address using which the multicast data is transmitted. Other identifiers such as URLs may as well be used in identifying each multicast application. As step 210 may draw a response with a list of multicast applications of interest, the notification of step 210 may also be viewed as a membership query.

In step 270, data switch 140 forwards to gateway 150 only the data related to multicast applications indicated to be of interest in step 230. Data switch 140 may receive such data from end machines executing the multicast applications. The received data may be forwarded to gateway 150 according to any compatible protocol and corresponding packet format. An example packet format and protocol is described in the sections below. The method ends in step 299.

The description is continued with reference to the manner in which gateway 150 may operate cooperatively with data switch 140 to provide multicast applications to mobile nodes 115. The manner in which data switch 140 may be first initialized to provide multicast applications is described below first (with reference to FIG. 3A), and the manner in which data related to multicast applications is transferred is then described (with reference to FIG. 3B).

4. Operation of Gateway in Initializing Support for Multicast Applications

Figure 3A:
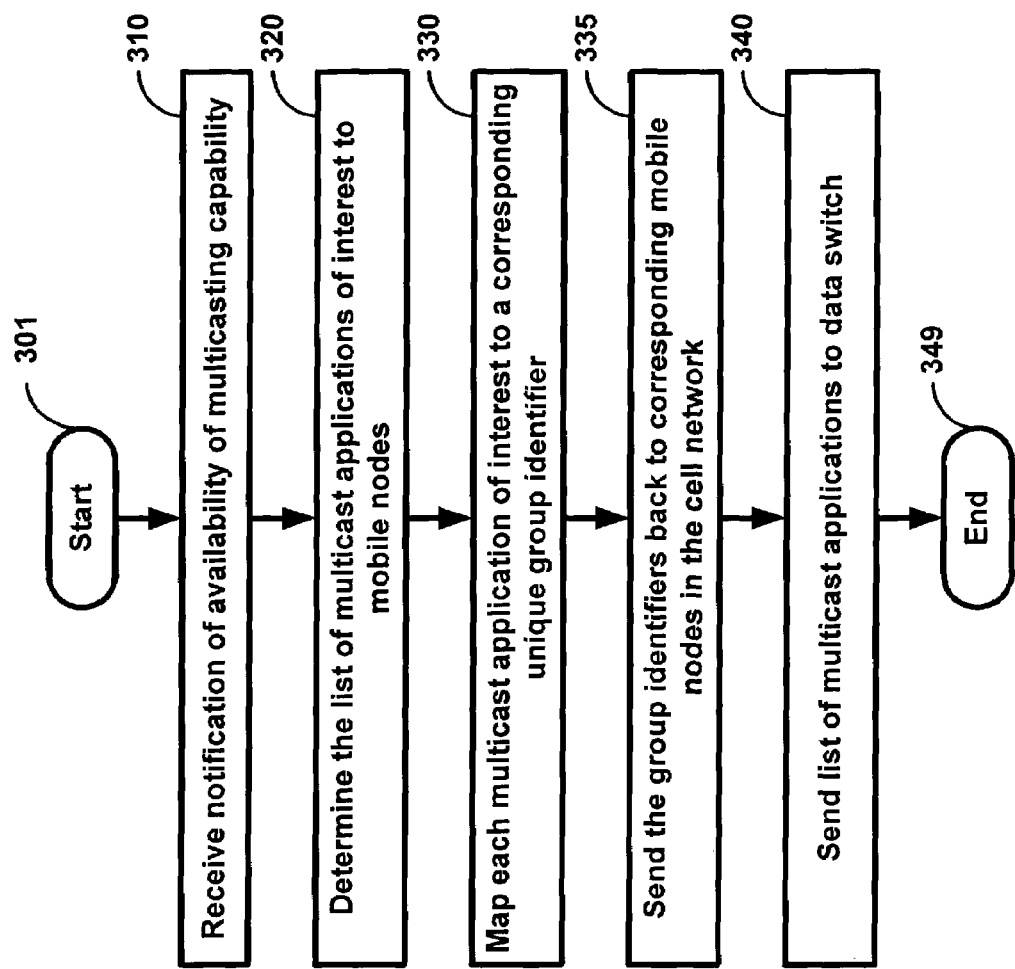
FIG. 3A is a flow chart illustrating the details of operation of a gateway in initialization phase in an embodiment of the present invention.

FIG. 3A is a flow chart illustrating the manner in which a gateway may be setup (initialized) to support specific multicast applications to specific interested mobile nodes. The corresponding phase is hereafter referred to as initialization phase for conciseness. The flowchart is described with reference to FIG. 1 for illustration. However, the flowchart can be implemented in other environments as well. The method begins in step 301, in which control immediately passes to step 310.

In step 310, gateway 150 receives a notification of availability of multicasting capability (to mobile nodes) from data switch 140. In step 320, gateway 150 determines the list of multicast applications of interest to mobile nodes. In an embodiment, gateway 150 interfaces with switching center 130 and base station 120 to cause a poll request to be generated to mobile nodes 115. Each mobile node then indicates the specific multicast application(s) of interest by sending back a corresponding class-D IP network address. The specific protocol and packet format used for such a poll request and for communicating the class-D IP network address is described with an example in sections below.

In step 330, gateway 150 maps each received multicast address to a corresponding unique group identifier. Thus, when a mobile node indicates interest in a multicast application, a new mapping entry may be created if the corresponding entry is not already present for the multicast address. The mapping information may be maintained in a data base. The group address may be used to identify each multicast application in additional communications between mobile nodes 115 and gateway 150. By designing the group address to be a small number, the number of bits in such additional communications may be minimized.

In step 335, gateway 150 sends group identifiers back to mobile nodes 115, such that each mobile node can associate the corresponding group identifier with a multicast application of interest. In an embodiment described below, the group identifier is sent back as a response when a mobile node indicates interest in a corresponding multicast application.

In step 340, the list of multicast address(es) is sent to data switch 140. The list may be sent initially as a response to the notification of availability of multicasting capability (step 310). However, the list may be updated as more mobile nodes subscribed to additional multicast applications. The method ends in step 349.

Once the list is sent, the initialization phase may be said to be complete. Gateway 150 may start receiving data related to the multicast applications (in the list) from data switch 140. The data may be forwarded to the mobile nodes as described below with reference to FIG. 3B. The corresponding phase is hereafter referred to as data transfer phase.

5. Operation of Gateway in Data Transfer Phase

Figure 3B:
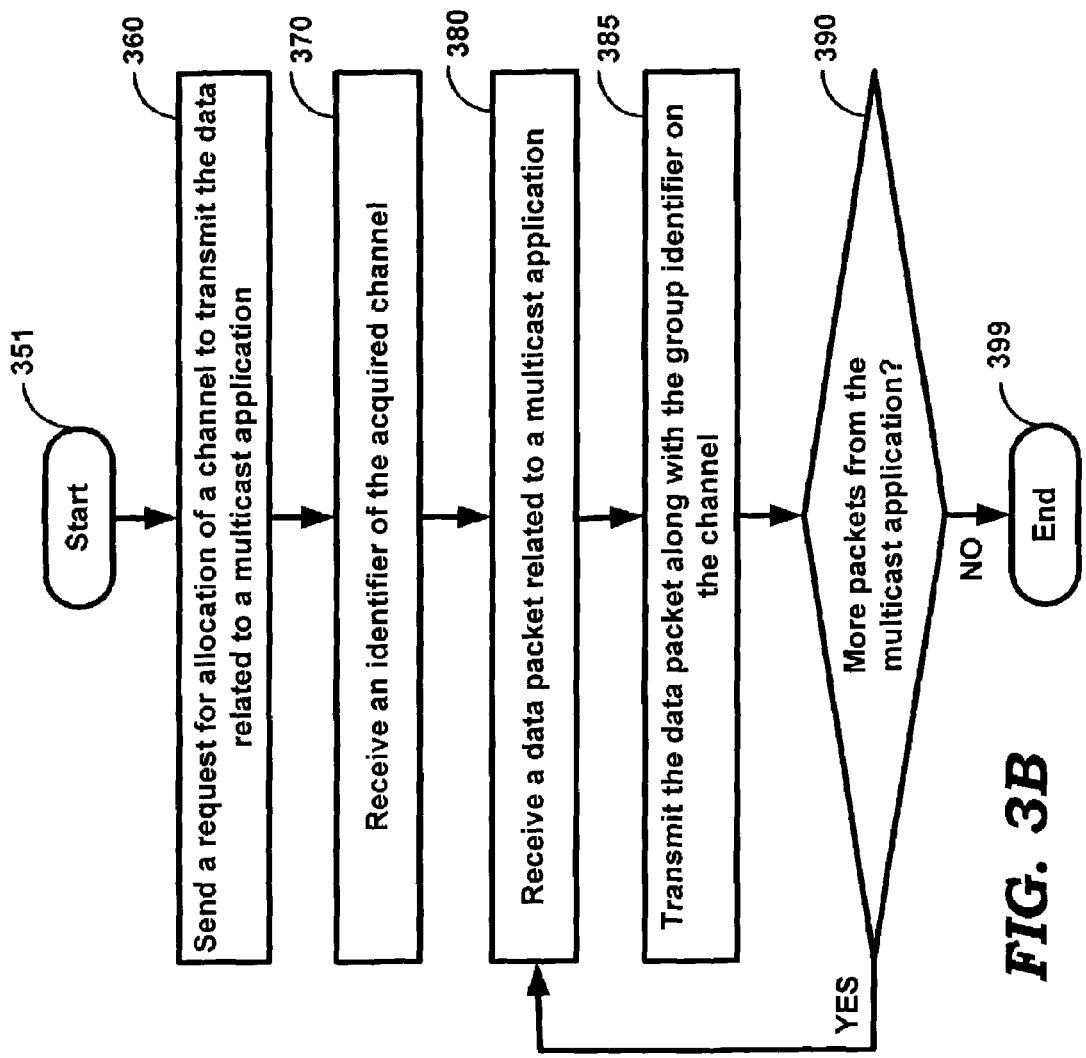
FIG. 3B is a flow chart illustrating the details of operation of a gateway in data transfer phase in an embodiment of the present invention.

FIG. 3B is a flowchart illustrating the manner in which an embodiment of gateway 150 may forward data related to a multicast application once the setup of FIG. 3A is complete and data is available for the multicast application. The method begins in step 351 and the control passes to 360.

In step 360, gateway 150 sends a request (to switching center 130) for allocation of a channel to transmit data related to a multicast application. The group identifier may be sent along with the request (channel acquisition request). As described in sections below, the group identifier is broadcast along with an identifier of the acquired/granted channel such that mobile nodes interested in that multicast application may start listening on the acquired channel for the data.

In step 370, gateway 150 receives an identifier ("channel identifier") of a channel on which the data for the multicast application can be transmitted. The channel identifier may be received from base station 120 on path 125.

In step 380, gateway 150 receives a data packet (or a data portion of the multicast application) from the multicast application via data switch 140. In an embodiment implemented in the context of GSM environment, each data packet is received encapsulated in GTP format, noted above.

In step 385, gateway 150 transmits the data packet along with the group identifier on the allocated channel. Mobile nodes 115 may identify the data as being related to a multicast application associated with the group identifier, and receive/process the data. In step 390, control passes to step 385 if more data packets are available, and otherwise to step 399. The method ends in step 399.

It may be appreciated that gateway 150 transmits a single copy of data related to a multicast application even if multiple mobile nodes are interested in the same application. The description is continued with reference to the manner in which switching center 130 may need to operate to support the initialization phase and the data transfer phases noted above.

6. Operation of Switching Center in Initialization Phase

Figures 4A, 4B:
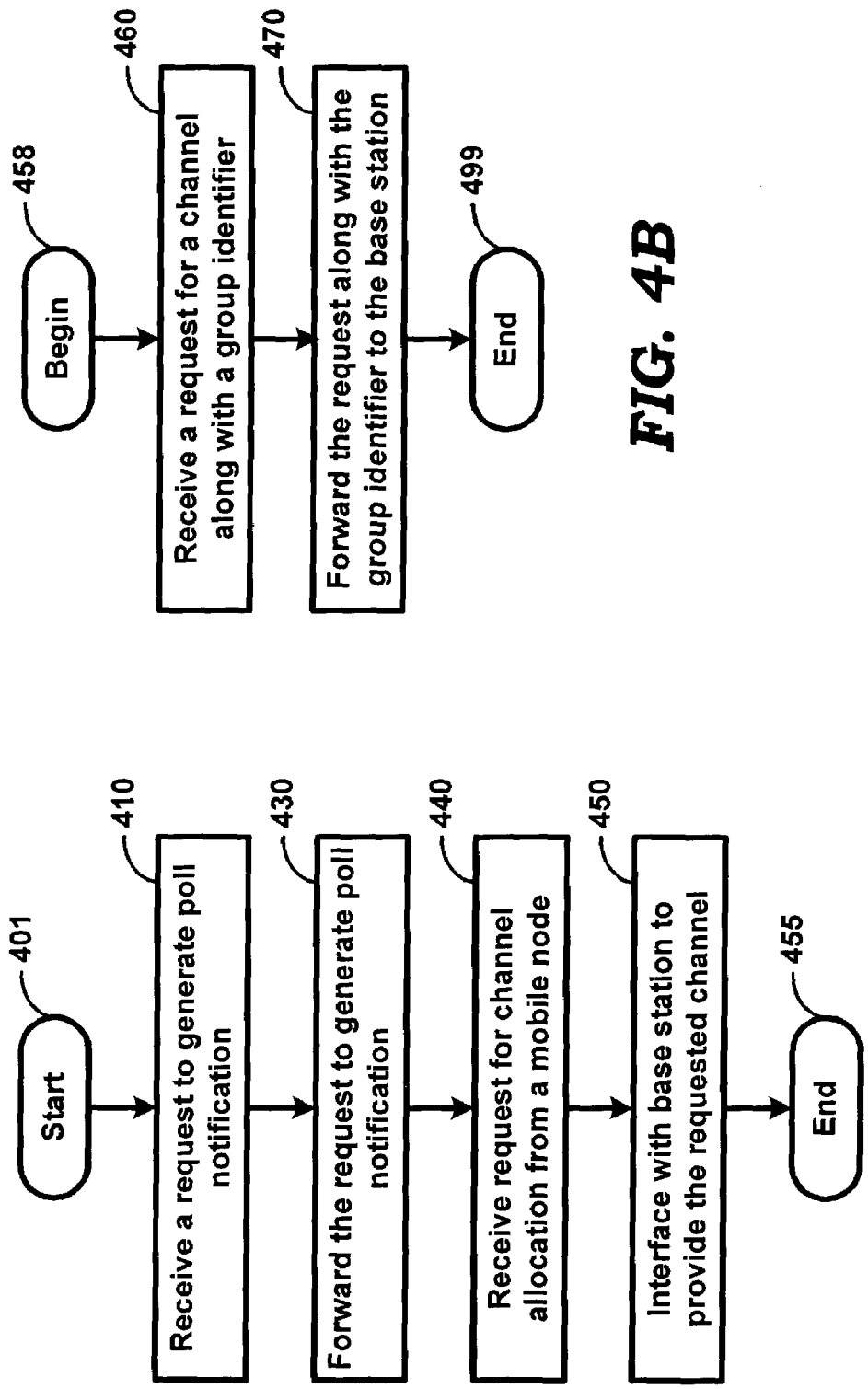
FIG. 4A is a flow chart illustrating the details of operation of a switching center in initialization phase in an embodiment of the present invention.
FIG. 4B is a flow chart illustrating the details of operation of a switching center in data transfer phase in an embodiment of the present invention.

FIG. 4A is a flowchart illustrating the manner in which an embodiment of switching center 130 operates in the initialization phase. The flowchart is described with reference to FIG. 1 for illustration only. However, the flowchart can be implemented in other embodiments without departing from the scope and spirit of the present invention. The method begins in step 401 in which the control passes to step 410.

In step 410, switching center 130 receives a request to generate a poll notification to mobile nodes 115. The poll notification causes mobile nodes 115 to indicate the specific multicast application(s) of interest. The notification and the response back with indication can generally be implemented according to any protocol. An example packet format and protocol are described in sections below. The poll notification may be received from gateway 150.

In step 430, switching center 130 forwards the request to generate a poll notification. In an embodiment described below in further detail, switching center 130 requests base station 120 to broadcast a packet which is interpreted by mobile nodes 115 as a poll notification. In step 440, switching center 130 may receive a request for data channel allocation (to gateway 150) from a mobile node. The data channel may be used by the mobile node to indicate a specific multicast application of interest to the gateway 150.

In step 450, switching center 130 interfaces with base station 120 to provide the requested data channel. Steps 440 and 450 may be performed for each mobile node communicating at least one multicast application of interest. The method ends in step 455.

Thus, the approach(es) of FIG. 4A may be used by switching center 130 to support the initialization phase. The description is continued with reference to the manner in which switching center 130 may need to operate to support the data transfer phase.

7. Operation of Switching Center in Data Transfer Phase

FIG. 4B is a flowchart illustrating the manner in which an embodiment of switching center 130 operates in the data transfer phase. The flowchart is described with reference to FIG. 1 for illustration only. However, the flowchart can be implemented in other embodiments without departing from the scope and spirit of the present invention. The method begins in step 458 in which the control passes to step 460.

In step 460, switching center 130 receives a request to allocate a data channel along with the group identifier. Gateway 150 may generate such a request to acquire the data channel to transfer data from a corresponding multicast application to mobile nodes.

In step 470, switching center 130 forwards the request along with the group identifier to base station 120. Base station 120 may be designed to allocate the data channel and communicate the channel identifier of the allocated channel to gateway 150. General considerations in the design of packet formats in forwarding the request is described in sections below. The method ends in step 499.

Thus, the approaches of above may be used to implement a switching center which supports both initialization and data transfer phases. Base station 120 may also need to support both the phases. Accordingly, the description is continued with reference to the manner in which base station 120 may need to operate to support the initialization phase.

8. Operation of Base Station in Initialization Phase

Figure 5B:
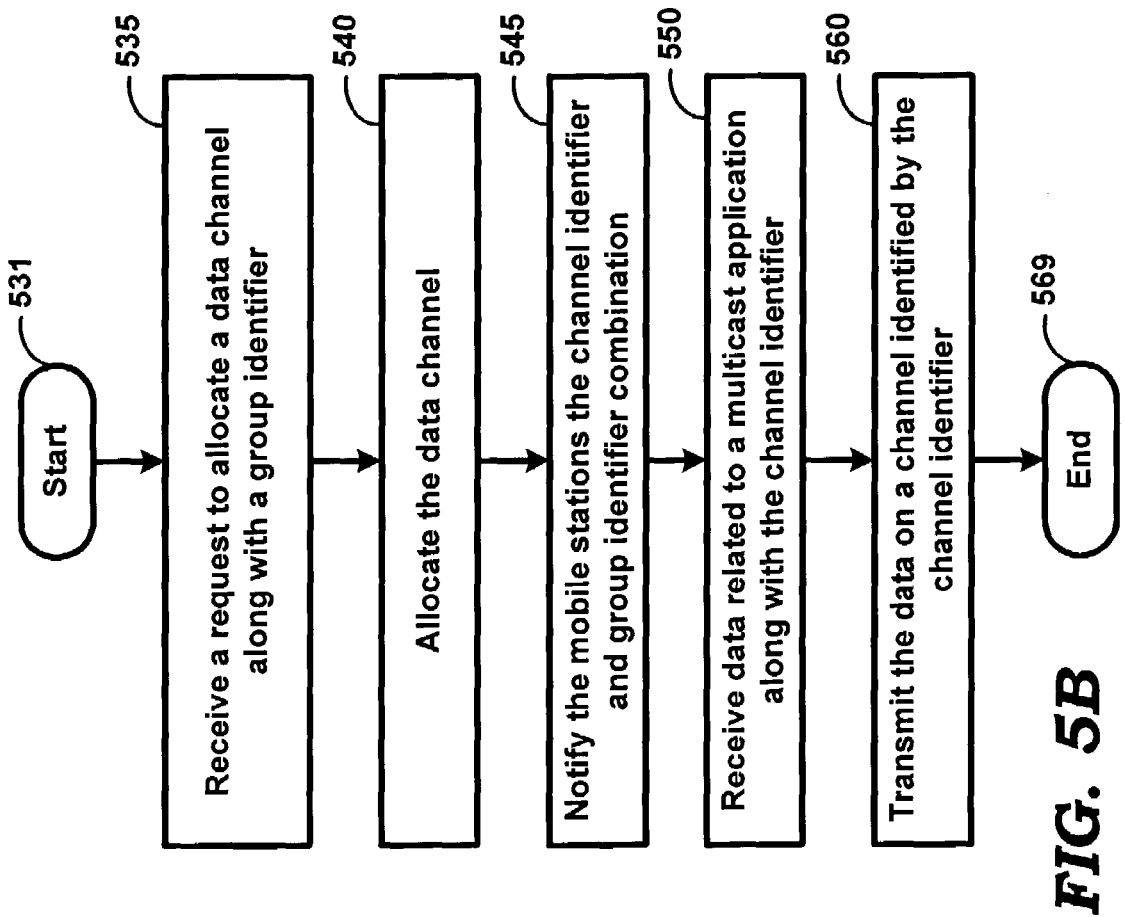
FIG. 5B is a flow chart illustrating the details of operation of a base station in data transfer phase in an embodiment of the present invention.
Figure 5A:
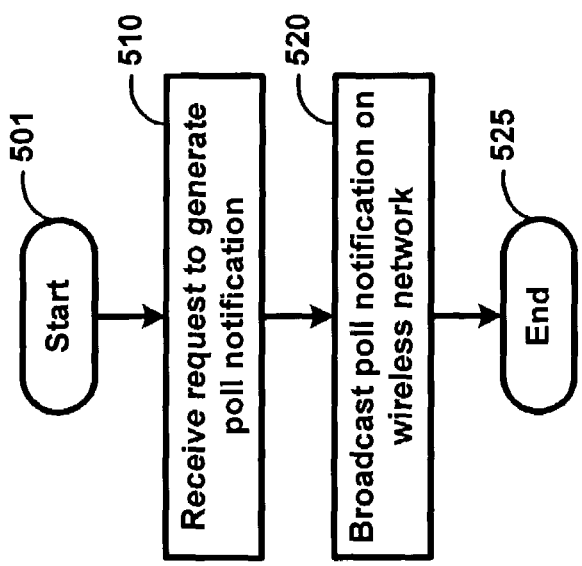
FIG. 5A is a flow chart illustrating the details of operation of a base station in initialization phase in an embodiment of the present invention.

FIG. 5A is a flowchart illustrating the manner in which an embodiment of base station 120 operates in the initialization phase. The flowchart is described with reference to FIG. 1 for illustration only. However, the flowchart can be implemented in other embodiments without departing from the scope and spirit of the present invention. The method begins in step 501 in which the control passes to step 510.

In step 510, base station 120 receives a request to generate a poll notification to mobile nodes 115. As noted above (with reference to step 410), the poll notification causes mobile nodes 115 to indicate the specific multicast application(s) of interest. The poll notification may be received from switching center 130.

In step 520, base station 120 may broadcast the poll notification on the cell-based wireless network 110. Each mobile node 115 may receive the poll notification and can subscribe to multicast applications of interest by interfacing with gateway 150. The method ends in step 525.

The description is continued with reference to the manner in which base station 120 may need to operate to support the data transfer phase.

9. Operation of Base Station in Data Transfer Phase

FIG. 5B is a flowchart illustrating the manner in which an embodiment of base station 120 operates in the data transfer phase. The flowchart is described with reference to FIG. 1 for illustration only. However, the flowchart can be implemented in other embodiments without departing from the scope and spirit of the present invention. The method begins in step 531 in which the control passes to step 535.

In step 535, base station 120 receives a request to allocate a data channel along with a group identifier. Such a request may originate at gateway 150 and be forwarded by switching center 130 on path 123. In step 540, base station 120 allocates the requested data channel. Along with such an allocation, the channel identifier may be communicated to gateway 150 on path 125. The allocation and communication (to base station 120) may be performed, for example, in a known way.

In step 545, base station 120 may broadcast on cell-based wireless network 110 a combination of the channel identifier and the received group identifier. Each mobile node may determine that data for the multicast applications specified by the group identifier will be available on the channel corresponding to the channel identifier.

In step 550, base station 120 may receive from gateway 120 data (data portion) related to the multicast applications along with the channel identifier. An example packet format for receiving the data and the channel identifier is described in sections below.

In step 560, base station 120 may transmit the received data on the channel identified by the received channel identifier. Steps 550 and 560 may be repeated until all the data for the multicast application is transmitted. The method ends in step 569.

Using the approaches described above, base station 120 may be implemented to support extending multicast applications on data networks to wireless networks. The description is continued with reference to the manner in which mobile nodes in wireless network 110 may need to operate in the initialization and data transfer phases.

10. Mobile Node in Initialization Phase

Figure 6B:
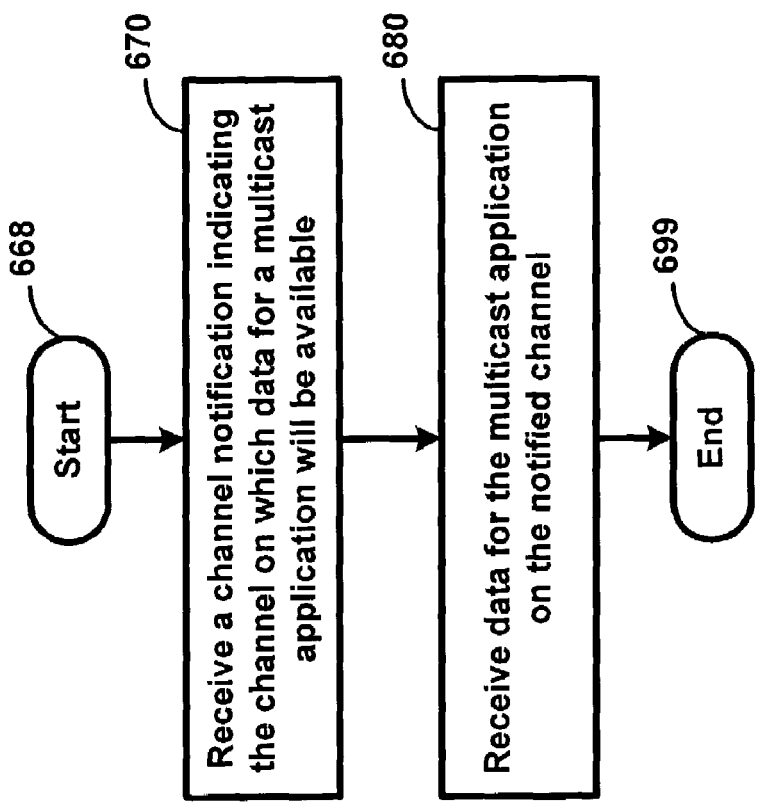
FIG. 6B is a flow chart illustrating the details of operation of a mobile node in data transfer phase in an embodiment of the present invention.
Figure 6A:
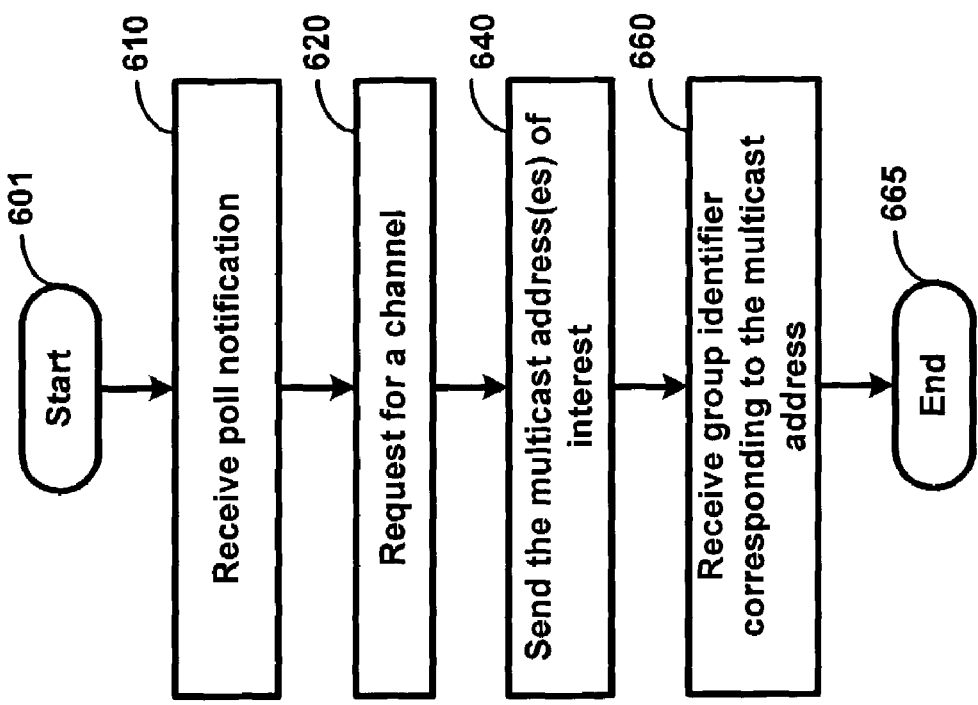
FIG. 6A is a flow chart illustrating the details of operation of a mobile node in initialization phase in an embodiment of the present invention.

FIG. 6A is a flowchart illustrating the manner in which an embodiment of mobile node 115 operates in the initialization phase. The flowchart is described with reference to FIG. 1 for illustration only. However, the flowchart can be implemented in other embodiments without departing from the scope and spirit of the present invention. The method begins in step 601 in which the control passes to step 610.

In step 610, mobile nodes 115 receive poll notification (or membership enquiry) broadcast by base station 120. In an embodiment the poll notification may indicate that each mobile node may indicate a corresponding list of multicast applications of interest.

In step 620, each mobile node may request for a data channel to indicate the multicast applications of interest. A mobile node may communicate with switching center 130 to cause a corresponding data channel to be allocated on cell-based wireless network 110. As is well known in the relevant arts, the data received on the data channel is forwarded to gateway 150.

In step 640, a mobile node may send on the allocated channel a list of multicast application(s) of interest. Gateway 150 receives the list of multicast application(s) sent by the mobile nodes, and thus determines the aggregate list of multicast applications of interest to all mobile nodes in cell-based wireless network 110.

In step 660, the mobile node may receive a group identifier corresponding to each multicast application of interest indicated in step 640. Such a group identifier may be received from gateway 150. Steps 620, 640 and 660 may be repeated when any mobile node requires to subscribe to a new multicast application(s). In addition, step 610 may also be sent periodically to ensure that any newly activated mobile nodes can also participate in multicast applications of interest. The method ends in step 665.

Thus, by using approaches such as that described above with reference to FIG. 6A, mobile nodes 115 may enable the initialization phase to be completed successfully. The description is continued with reference to the manner in which mobile node may need to operate to support the data transfer phase.

11. Mobile Node in Data Transfer Phase

FIG. 6B is a flowchart illustrating the manner in which an embodiment of mobile node 115 operates in the data transfer phase. The flowchart is described with reference to FIG. 1 for illustration only. However, the flowchart can be implemented in other embodiments without departing from the scope and spirit of the present invention. The method begins in step 668 in which the control passes to step 670.

In step 670, mobile node 115 may receive a notification of the channel (identified by a channel identifier) on which data for the multicast application with the group identifier may be available. The notification may be broadcast by base station 120 upon receiving a corresponding request from switching center 130.

In step 680, mobile node 115 may receive data related to a multicast application on the notified channel. As described above, gateway 150 may send data packets along with the corresponding channel identifier to base station 120, and base station 120 may broadcast the data packets on a channel with the channel identifier. The method ends in step 699.

Thus, the approaches described above may be used to extend multicast applications available on data networks to cell-based wireless networks. However, the communications may need to be supported by appropriate packet formats.

Example packet formats in some example situations are described below for illustration.

12. Packet Formats for Communication Between Data switch and Gateway

As described above with reference to steps 210 and 230 of FIG. 2, data switch 140 sends notification of availability of multicasting capability and receives from gateway 150 a list of multicast applications of interest to mobile nodes 115 in cell-based wireless network 110. Some general considerations in implementing example packet formats are described below.

Broadly, GTP can be extended to enable communication between data switch 140 and gateway 150. The base packet format is described in a document entitled, "3GPP TS 29.060 V3.11.0 (2001-12); 3rd Generation Partnership Project; Technical Specification Core Group Network; General Packet Radio Service (GPRS); GPRS Tunneling Protocol (GTP) across the Gn and Gp interface (Release 1999)", which is noted in the sections above, and is incorporated in its entirety herewith.

Message type field in octet 2 of a GTP packet may be set to the next unused value to indicate communication between data switch 140 and gateway 150 as needed to implement the above described approaches. Such an unused value may be secured as described in RFC 1700 entitled, "Assigned Numbers", Authors: Reynolds, J. and J. Postel, dated October 1994, and also as described in a document entitled, "Protocol Numbers and Assignment Services", available from Internet Assigned Numbers Authority, 4676 Admiralty Way, Suite 330, Marina del Rey, Calif. 90292 (also available at http://www.iana.org/numbers.html).

Octet 9 of the GTP packet may be set to one value (e.g., 0) to indicate that the data packet represents a notification from data switch 140 (as in step 210), and to another value (e.g., 1) to indicate that the data packet represents the response (as in step 230) or generally the list of multicast applications at any time.

In case Octet 9 equals 0 (i.e., notification from data switch 140 to gateway 150), bytes 10-11 may indicate a maximum response time field and bytes 12-13 may include a checksum field. The maximum response time indicates a maximum number of seconds in which gateway 150 needs to provide a response. A value of all ones indicates there is no such maximum duration.

In the case Octet 9 equals 1 (i.e., list of multicast applications of interest), Octets 10 onwards may be used to send class-D IP addresses (indicating the multicast applications of interest). In an embodiment, octets 10-11 represents a length indicating the number of class-D IP addresses to follow. Octets 12 onwards contain the list of the class-D IP addresses. A checksum field may follow the last class-D IP address, and may be computed as noted in the previous paragraph. The description is continued with reference to packet formats for communication between gateway 150 and switching center 130.

13. Packet Formats for Communication Between Gateway and Switching Center

As described above with reference to step 320 of FIG. 3A, gateway 150 requests switching center 130 to send a poll notification to mobile nodes 115. In addition, in step 360 of FIG. 3B, gateway 150 sends a request for a channel to transmit data for a multicast application. Some general considerations in implementing example packet formats are described below.

Broadly, it is helpful to understand that BSSAP+ protocol defines a standard for communication between gateway 150 and switching center 130, and that BSSMAP protocol defines a standard for communication between base station 120 and switching center 130. In addition, BSSMAP protocol defines several information elements which are used in communication between switching center 130 and base station 120. BSSAP+ protocol may be extended to include information elements similar to as in BSSMAP to communicate various pieces of data as necessary to implement several features of the present invention. By using information elements of BSSMAP, switching center 130 may merely need to copy the same data content when generating packets for sending to base station 120.

BSSAP+ is described in a document entitled, "3GPP TS 29.018 V4.2.0 (2001-12); 3rd Generation Partnership Project; Technical Specification Core Group Network; General Packet Radio Service (GPRS); Serving GPRS Support Node (SGSN)—Visitors Location Register (VLR); Gs interface layer 3 specification (Release 4)", (hereafter BSSAP+ document") which is incorporated in its entirety herewith. BSSMAP is described in a document entitled, "3GPP TS 08.08 V8.11.0 (2002-01); 3rd Generation Partnership Project; Technical Specification Group GSM EDGE Radio Access Network; Mobile-services Switching Center-Base Station System; (MSC-BSS) interface; Layer 3 specification; (Release 1999)" (hereafter "BSSMAP document"). Both the documents are incorporated in their entirety herewith.

BSSAP+ protocol may be extended to include two new message types. As is well known, the pre-defined message types are indicated in "Table 18.2/3GPP TS 29.018: Message type information element" of BSSAP+ document, and the next two unused values (e.g., 0011011 and 0011100) may be used for the two information types. The first new type may be used for the poll notification request (step 320) and the second new type may be used for requesting new channel (step 360).

Within these two message types, information elements may be included to communicate various pieces of information necessary. Thus, in an embodiment, four information elements are defined: Channel Type (01000000), Cell Identifier (01000001), Group Call Reference (01000010), and Assignment Requirement (010000111). The group call reference information element may be used to transmit the group identifier.

For the poll notification, a value in the group call reference information element may be set to 0 to indicate that the packet is intended to request a poll notification (or membership enquiry). The other information elements may be used to various other parameters, the design of which will be apparent to one skilled in the relevant arts. Various other information elements also may be included as desired by a designer.

For channel assignment request, the group call reference information element may be used to specify the group identifier. The channel type, cell identifier and assignment requirement information elements (among others) may be used to specify various other parameters associated with the requirements associated with the channel, and the use of the information element will be apparent to one skilled in the relevant arts.

It may be appreciated that the channel assignment request results in a response. As noted above, a new message type is defined according to the BSSAP+ protocol for the response. Again, information elements from BSSMAP document may be used to indicate the related information. In an embodiment, four information elements (among others)—Message Type, Channel Type, Cell Identifier, and Chosen Channel— are used to communicate the assignment information. The chosen channel information element contains the channel identifier value.

Thus, any communications necessary between switching center 130 and gateway 150 may be facilitated by using packet formats such as those described above. The description is continued with reference to the packet formats, which can be used for communication between switching center 130 and base station 120.

14. Packet Formats Between Switching Center and Base Station

As described above with reference FIGS. 4A and 4B, switching center 130 requests base station 120 to send a poll notification (step 410), allocate a channel (450) when mobile node requires a channel to communicate with gateway 150, and facilitate gateway 150 to acquire a channel (step 470). Some general considerations in implementing example packet formats are described below.

As noted above, BSSMAP provides a communication protocol between switching center 130 and base station 120. In addition, the information elements sent by gateway 150 are similar to as in BSSMAP. Accordingly, the same information elements may be conveniently forwarded in appropriate packet content. For example, the poll notification request (410) and channel acquisition request (470) for data transfer phase may be sent by forwarding the same information elements received from gateway 150. On the other hand, the allocation of a channel to a mobile node (for communication with gateway 150) (step 450) may be performed in a known way.

Thus, using packet formats such as those described above, communication may be implemented between switching center 130 and base station 120. The description is continued with reference to packet formats between base station 120 and mobile nodes 115.

15. Packet Formats Between Base Station and Mobile Nodes

As described above with reference to FIG. 5A, base station 120 sends a poll notification (step 520), and also a combination of channel identifier and group identifier (step 545). In an embodiment, both the communications are attained using notification channel (NCH), which is described in further detail in a document entitled, "3GPP TS 44.018: Digital cellular telecommunications system (Phase 2+); Mobile Radio Interface—Layer 3 Specification RR part", and is incorporated in its entirety herewith.

A poll notification is sent by sending a null-notification in NCH channel. In an embodiment, the null notification is specified by setting 'NT/N Rest Octets' of an information element (having a value of) to 0. It may be appreciated that Table 9.1.21b.1 of a document entitled, "3GPP TS 44.018: Digital cellular telecommunications system (Phase 2+); Mobile Radio Interface—Layer 3 Specification RR part" (the document is incorporated in its entirety herewith) provides the packet format for NCH sent to mobile nodes.

Section 10.5.2.22c of this same document provides the format for "NT/N Rest octets" information element. Broadly, the group identifier value may be placed in place of Group Call Reference. The combination of channel identifier and group identifier is also sent on NCH channel. For example, the corresponding data may be sent as part of the 'Rest Octets' field.

16. Packet Formats for Communication Between Gateway and Base Station

As described above with reference to step 385 of FIG. 3B, gateway 150 sends data packets with the channel identifier to base station 120. Some general considerations in implementing example packet formats are described below.

Broadly, BSSGP provides a protocol for communication between gateway 150 and base station 120. BSSGP protocol can be extended to facilitate various features of the present invention. BSSGP is described in further detail in a document entitled, "GSM 08.18: Digital cellular telecommunications system (Phase 2+); General Packet Radio Service (GPRS); Base Station System (BSS) Serving GPRS Support Node (SGSN); BSS GPRS Protocol (BSSGP)", (hereafter "BSSGP document"), and is incorporated in its entirety into the present application.

As may be appreciated, the data related to each multicast application needs to be transmitted on a corresponding channel (acquired earlier and identified by the corresponding channel identifier). To indicate the specific channel identifier along with the data portion to be broadcast, an embodiment may use a PDU type of PTM-UNITDATA (0x03 in the PDU type field) as noted in Section 10.2.4 of the BSSGP document.

The PDU-type can be extended to include an additional information element. This additional information element may indicate the specific channel identifier. In an embodiment, the same information element format used to receive the channel identifier (when requesting a channel) may be used in the PTM-UNITDATA PDU as well.

Thus, using packet formats such as those described above, communication may be implemented between gateway 150 and base station 120. The description is continued with reference to packet formats between gateway 150 and mobile nodes 115.

17. Packet Formats Between Gateway and Mobile Nodes

As described above with reference to FIG. 6A, mobile node 115 sends a multicast address of interest to gateway 150 (step 640) and receives a group identifier corresponding to multicast address (660). Some general considerations in implementing example packet formats for the related communications are described below.

With reference to sending data representing a multicast application of interest, an embodiment of mobile node extends SABM (set balance asynchronous mode) packet format. SABM is described in further detail in a document entitled, "3GPP TS 44.006 V4.0.0 (2001-04); Technical Specification; 3rd Generation Partnership Project; Technical Specification Group GSM EDGE Radio Access Network; Mobile Station-Base Station System (MS-BSS) interface; Data Link (DL) layer specification (Release 4)", which is incorporated in its entirety into the present application.

In an embodiment, SABM format may be extended to include an information field (to indicate class D IP address) akin to "Version 2 Membership Report" described in RFC 2236 entitled, "Internet Group Management Protocol", by W. Fenner, available from www.ietf.org, and is incorporated in its entirety herewith.

With reference to packet format for sending a group identifier for a multicast application/address, an unnumbered acknowledgment packet type of SABM may be used to send the group identifier back to the mobile node. The description is continued with reference to summary for initialization and data transfer phases.

18. Summary of the Initialization Phase

The initialization phase in an example scenario is briefly described with reference to FIG. 1 for illustration. Data switch 140 may cause membership query request to be generated on cell-based wireless network 110 by interfacing with switching center 130. In response, each mobile node may indicate a corresponding wireless application of interest. Gateway 150 may assign a unique identifier (group identifier) for each multicast application and communicates the unique identifier to the mobile node indicating interest (in that multicast application).

Gateway 150 thus determines all the multicast applications of interest to mobile nodes 115 and communicates a unique identifier to each mobile node interested in the same multicast application. The list of all the multicast applications may be sent to data switch 140. Data switch 140 may communicate with other IP routers (not shown) to ensure that the data related to multicast applications is forwarded to data switch 140 as well. Data switch 140 forwards such received data to gateway 150, as described below in the data transfer phase.

19. Summary of Data Transfer Phase

In the data transfer phase, gateway 150 determines that data is available for a specific multicast application, for example, based on reception of data with the corresponding class-D IP network address in the destination field. Gateway 150 requests switching center 130 to allocate a data channel for transmitting the data and the group identifier of the multicast application may be sent along with the request.

Switching center 130 forwards the request (along with the group identifier) to base station 120, which allocates the requested data channel. Base station 120 communicates the channel identifier to both switching center 130 and gateway 150. In addition, base station 120 broadcasts the combination of channel identifier and group identifier on cell-based wireless network 110.

In response, mobile nodes which have earlier been sent the group identifier earlier (in the initialization phase), determine that the data corresponding to the multicast application identified by the group identifier will be received on the data channel with the channel identifier.

Gateway 150 sends the channel identifier along with each data portion of the multicast application to base station 120. Base station 120 transmits the data portion on the data channel corresponding to the channel identifier. The mobile nodes which have indicated interest (to gateway 150) in the multicast application receive the data, and operate as leafs of the corresponding multicast application.

While the description above is provided with reference to mobile nodes which are operational when a membership query is received, other mechanisms may be provided to enable mobile nodes to join multicast applications as described below.

20. Dynamic Joining

In one embodiment, dynamic joining of mobile nodes to multicast applications is facilitated by periodically sending a poll request (initiated by gateway 150, as described above). A mobile node can then join in any multicast applications of interest as described above.

In another embodiment, a mobile node may acquire a channel (by interacting with switching center 130), and send to gateway 150 a SABM (unsolicited packet) with the information field containing with an extension. The extension may contain the class-D IP network address of interest. Gateway 150 may map the class-D IP network address to a group identifier and send the group identifier back to the mobile node in a UA response. Gateway 150 may inform data switch 140 of the new multicast application of interest. Data related to the new multicast application may be provided to the mobile node as described in sections above.

Thus, using the approaches and packet formats described above, mobile nodes, base stations, gateways, switching centers and data switches may be implemented to extend multicast applications to mobile nodes on cell-based wireless networks. It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the systems with a desired mix of hardware, software and/or firmware. Embodiments implemented substantially in software are described below.

21. Software Implementation

Figure 7:
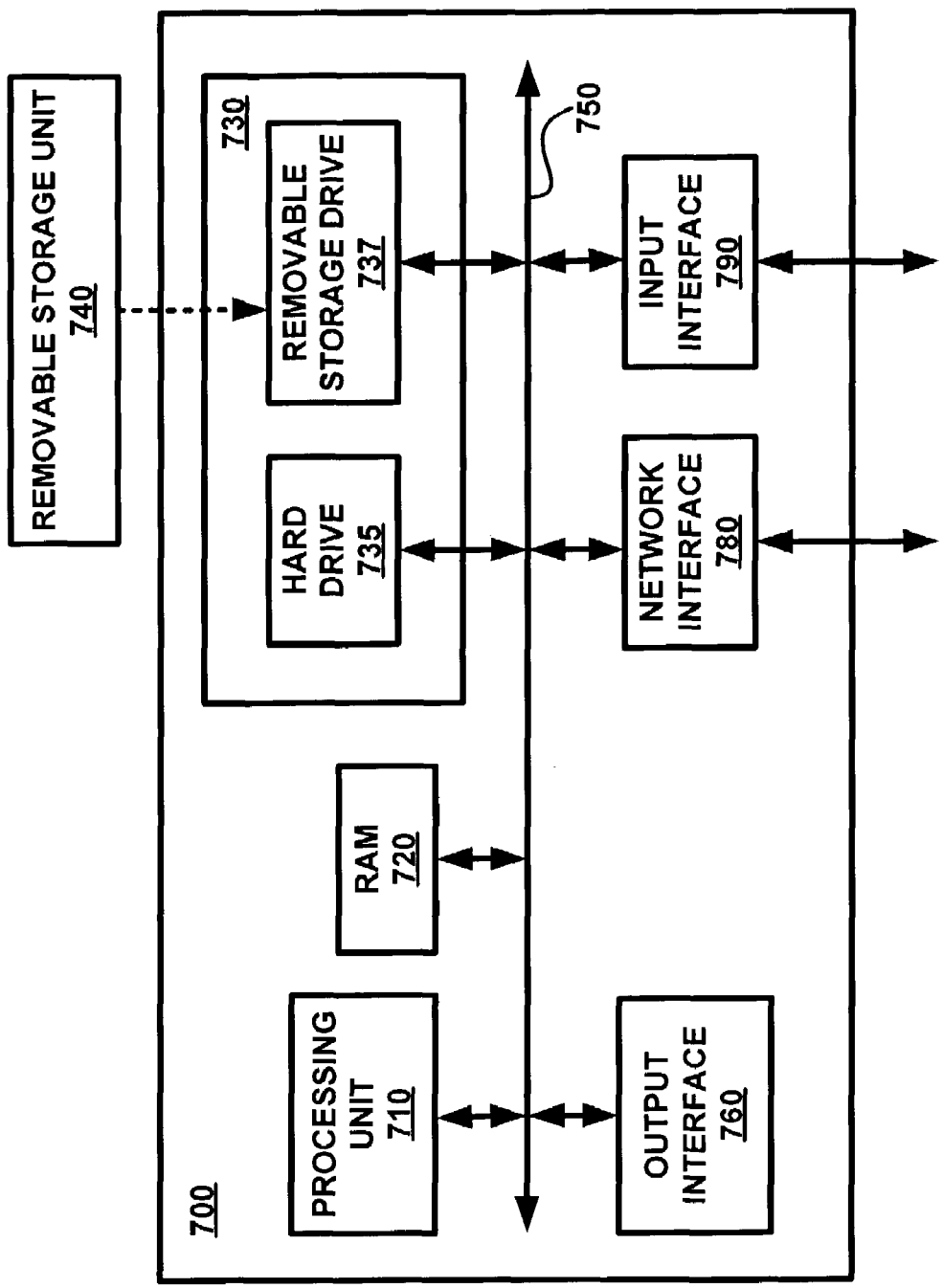
FIG. 7 is a block diagram illustrating the details of various systems substantially in the form of software instructions according to an aspect of the present invention.

FIG. 7 is a block diagram illustrating the details of system 700, which may represent any of mobile node 115, base station 120, switching center 130, data switch 140, or gateway 150. System 700 is shown containing processing unit 710, random access memory (RAM) 720, storage 730, output interface 760, network interface 780 and input interface 790. Each component is described in further detail below.

Output interface 760 provides output signals (e.g., display signals to a display unit, not shown) which can form the basis for a suitable user interface for a person (e.g., administrator in the case of a gateway and an end user in the case of an end system) to interact with system 700. Input interface 790 (e.g., interface with a key-board, dial-pad and/or mouse, not shown) enables a person to provide any necessary inputs to system 700.

Network interface 780 enables system 700 to send and receive data packet according to corresponding protocols/physical interfaces. For example, mobile nodes 115 may communicate through an antenna using GSM technology to transmit data representing voice, data or control signals. Data switch 140 may communicate with end machines and gateway 150 using IP protocol, possibly on different interface units. In the case of base station 120, network interface 780 may contain a transceiver, etc. Network interface 780, output interface 760 and input interface 790 can be implemented in a known way.

RAM 720 and storage (secondary memory) 730 may together be referred to as a memory. While the memory units are shown provided within system 700, it should be understood that the memory can be provided from external units as well (using technologies such as network file sharing, storage area networks, etc.). RAM 720 receives instructions and data on path 750 from storage 730, and provides the instructions to processing unit 710 for execution. In addition, RAM 720 may be used to implement one or more of network address translation tables present in system 700.

Secondary memory 730 may contain units such as hard drive 735 and removable storage drive 737 storing data, which is readable by machines. Thus, secondary memory 730 may be viewed as containing machine readable medium.

Secondary storage 730 may store the software instructions and data, which enable system 700 to provide several features in accordance with the present invention.

Some or all of the data and instructions may be provided on removable storage unit 740, and the data and instructions may be read and provided by removable storage drive 737 to processing unit 710. Floppy drive, magnetic tape drive, CD-ROM drive, DVD Drive, Flash memory, removable memory chip (PCMCIA Card, EPROM) are examples of such removable storage drive 737.

Processing unit 710 may contain one or more processors. Some of the processors can be general purpose processors which execute instructions provided from RAM 720. Some can be special purpose processors adapted for specific tasks (e.g., for memory/queue management). The special purpose processors may also be provided instructions from RAM 720. In general, processing unit 710 reads sequences of instructions from various types of memory medium (including RAM 720, storage 730 and removable storage unit 740), and executes the instructions to provide various features of the present invention as described above.

While the embodiments of FIG. 7 are described as being implemented in the form of software instructions, it should be understood that each system may be implemented substantially in the form of hardware as well. Example embodiments implemented in the form of hardware are described below. The embodiments may use the packet formats and approaches described in sections above, as felt suitable in specific situations.

22. Data Switch

Figure 8:
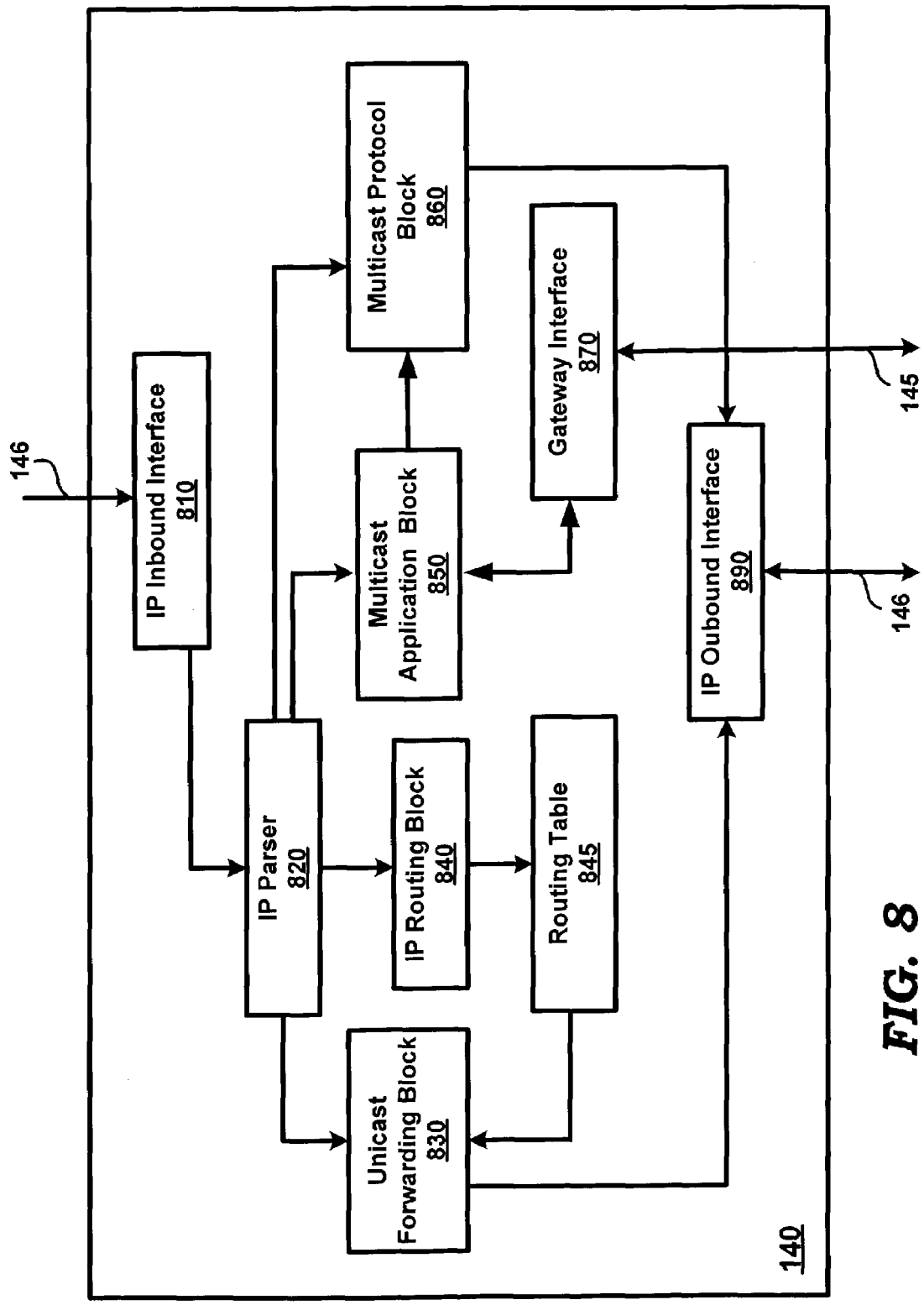
FIG. 8 is a block diagram illustrating the manner in which a data switch may be implemented in an embodiment of the present invention.

FIG. 8 is a block diagram illustrating the details of an embodiment of data switch 140 as relevant to several aspects of present invention. Data switch 140 is shown containing IP inbound interface 810, IP parser 820, unicast forwarding block 830, IP routing block 840, routing table 845, multicast application block 850, multicast protocol block 860, gateway interface 870 and IP outbound interface 890. Each block is described below in further detail.

Each of IP outbound interface 880 and inbound interface 810 provide electrical and protocol interface to respectively send/receive data packets on path 801 to/from data network 160. The packets received are forwarded to IP parser 820.

IP parser 820 examines each IP packet received from IP interface 810 to determine whether to forward the packet to unicast forwarding block 830, IP routing block 840, multicast application block 850 or multicast protocol block 860. The determination is generally performed by examining the packet content.

Packets requiring further forwarding may be forwarded to unicast forwarding block 830. Packets related to IP routing protocols (e.g., RIP or OSPF) may be forwarded to IP routing block 840. Packets related to multicast applications may be forwarded to multicast application block 850. Packets related to multicast protocols (e.g., MOSPF, well known in the relevant arts) may be forwarded to multicast protocol block 860.

IP routing block 840 populates routing table 845, typically based on packets related to IP routing protocols such as RIP. Unicast forwarding block 830 forwards unicast data packets (using IP outbound interface 890) according to the entries in routing table 845. Unicast forwarding block, IP routing block 840 and routing table 845 may be implemented in a known way.

Multicast application block 850 sends a membership query on gateway interface block 870 and receives multicast addresses (thus, multicast applications) of interest to mobile nodes in response on the same interface block. The packet formats (using GTP) described above may be used for both the query and response. The list of class-D addresses thus determined may be forwarded to multicast protocol block 860.

Multicast application block 850 receives packets related to various multicast applications from IP parser 820, and forwards only those packets which relate to the multicast applications of interest on gateway interface 870.

Further, multicast protocol block 860 participates in multicast protocols such as MOSPF, and communicates to the other routers the specific class-D addresses of interest. The multicast protocol ensures that the data related to the corresponding multicast applications are received by data switch 140.

The description is continued with reference to an example implementation of gateway 150.

23. Gateway

Figure 9:
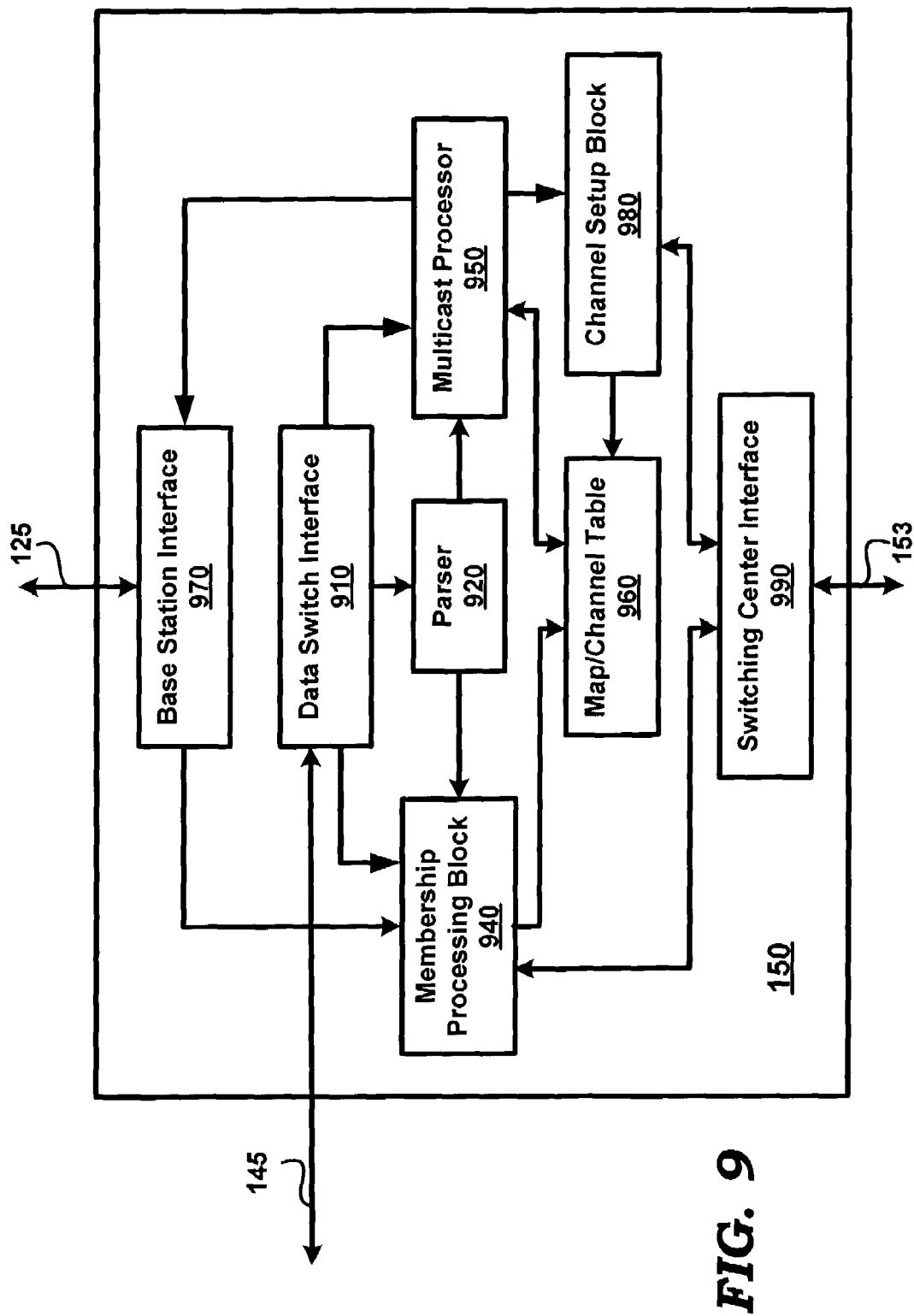
FIG. 9 is a block diagram illustrating the manner in which a gateway may be implemented in an embodiment of the present invention.

FIG. 9 is a block diagram illustrating the details of an embodiment of gateway 150 as relevant to several aspects of present invention. Gateway 150 is shown containing data switch interface 910, parser 920, membership processing block 940, multicast processor 950, map/channel table 960, base station interface 970, channel setup block 980, and switching center interface 990. Each block is described below in further detail.

Data switch interface 910 provides electrical, physical and protocol interfaces necessary to communicate with data switch 140. The received packets are forwarded to parser 920 for further processing. Base station interface 970 and switching center interface 990 may similarly provide various interfaces necessary for communicating with base station 120 and switching center 130 respectively. Data switch interface 910, base station interface 970 and switching center interface 990 may be implemented in a known way.

Parser 920 examines the content of each incoming packet to determine the next block to forward the packet. Packets indicating availability of multicasting capability (or membership query) are forwarded to membership processing block 940. Multicast packets related to multicast applications are forwarded to multicast processor 950.

Membership processing block 940 sends a poll notification using switching center interface 990 on receiving a membership query. Membership processing block 940 receives multicast applications/address(es) in response from each of the mobile nodes via base station interface 970. The list of addresses may be sent to data switch 140 using data switch interface 910. The membership query may be sent periodically to allow for dynamic joining of mobile nodes, and the updated list may be sent to data switch 140.

Membership processing block 940 generates a unique group identifier for each multicast application of interest. The corresponding map is maintained in map/channel table 960. Map/channel table 960 may also store a specific channel identifier being used to transmit the data of the corresponding multicast application also as described below.

Multicast processor 950 selects a channel (on cell-based wireless network 110) from map/channel block 960 to send each multicast packet received from parser 920. If a channel is not present associated with a multicast application (class D IP network) in map/channel table 960, multicast processor 950 requests channel setup block 980 to set up a channel. Once a channel is determined, multicast processor 950 forwards each multicast packet (along with the channel identifier) to base station 120 using base station interface 970.

Channel setup block 980 interfaces with switching center 130 (using switching center interface 990) to determine a channel on which to transmit data related to each user application. A channel may be determined when a mobile node indicates a network application or interest. In an embodiment, if data is not transferred on a channel for a specific duration, the channel may be released, and a new channel may be set up for the corresponding multicast application when data needs to be transmitted again.

Thus, an embodiment of gateway 150 may be implemented as described above. The description is continued with reference to an example implementation of switching center 130.

24. Switching Center

Figure 10:
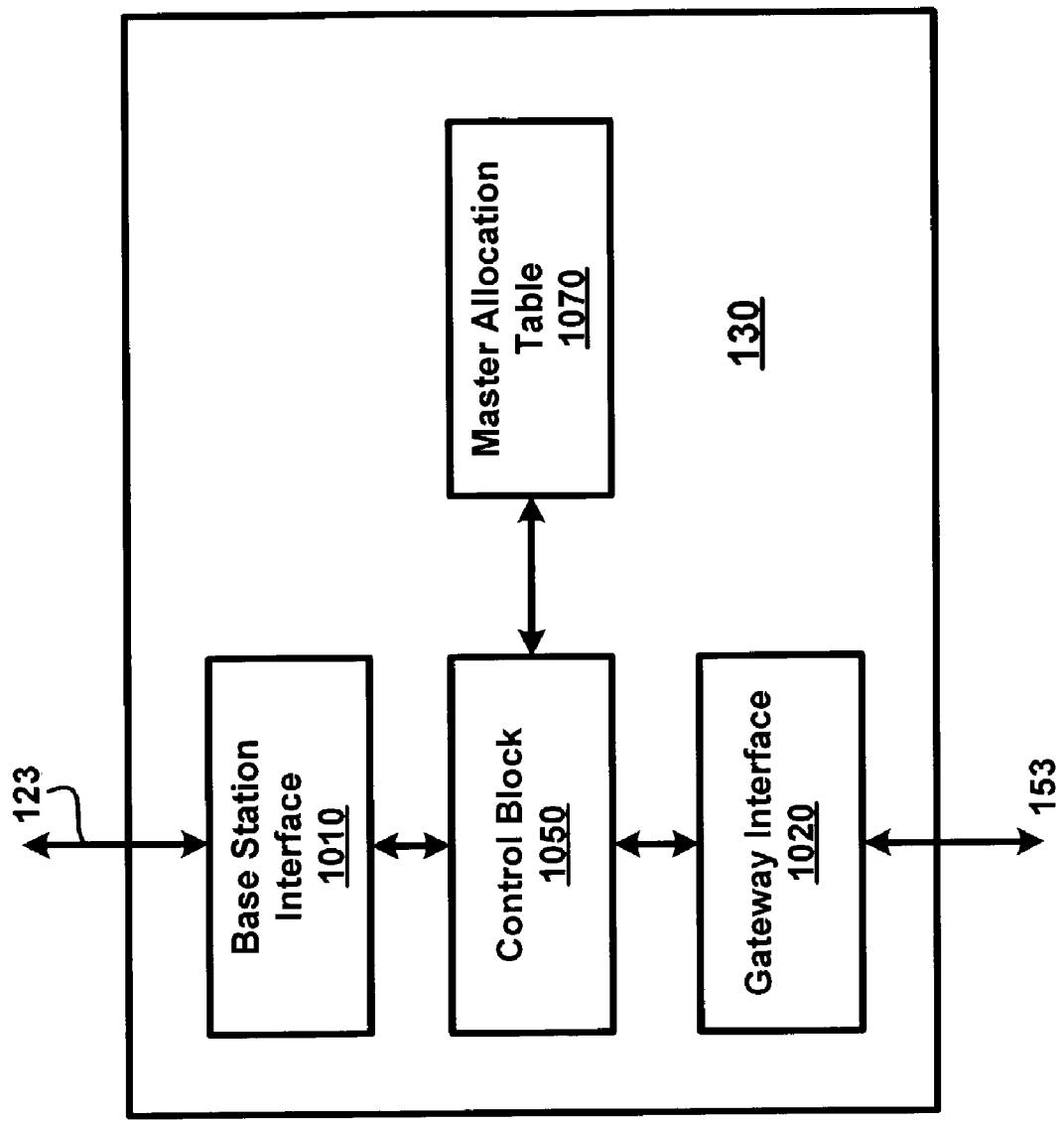
FIG. 10 is a block diagram illustrating the manner in which a switching center may be implemented in an embodiment of the present invention.

FIG. 10 is a block diagram illustrating the details of an embodiment of switching center 130 as relevant to several aspects of present invention. Switching center 130 is shown containing base station interface 1010, gateway interface 1020, control block 1050 and master allocation tables 1070. Each block is described below in further detail.

Each of base station interface 1010 and gateway interface 1020 provides the physical, electrical and protocol interfaces necessary to interface with base station 120 and gateway 150 respectively. The packets received from gateway 150 and base station 120 are forwarded to control block 1050.

Control block 1050 processes the incoming packets to coordinate the allocation of various resources on cell-based wireless network 110 and also provide connectivity to cells served by other switching centers. Control block 1050 keeps track of the resource allocation and availability by storing the appropriate data in master allocation tables 1070.

The description is continued with reference to an example implementation of base station 120.

25. Base Station

Figure 11:
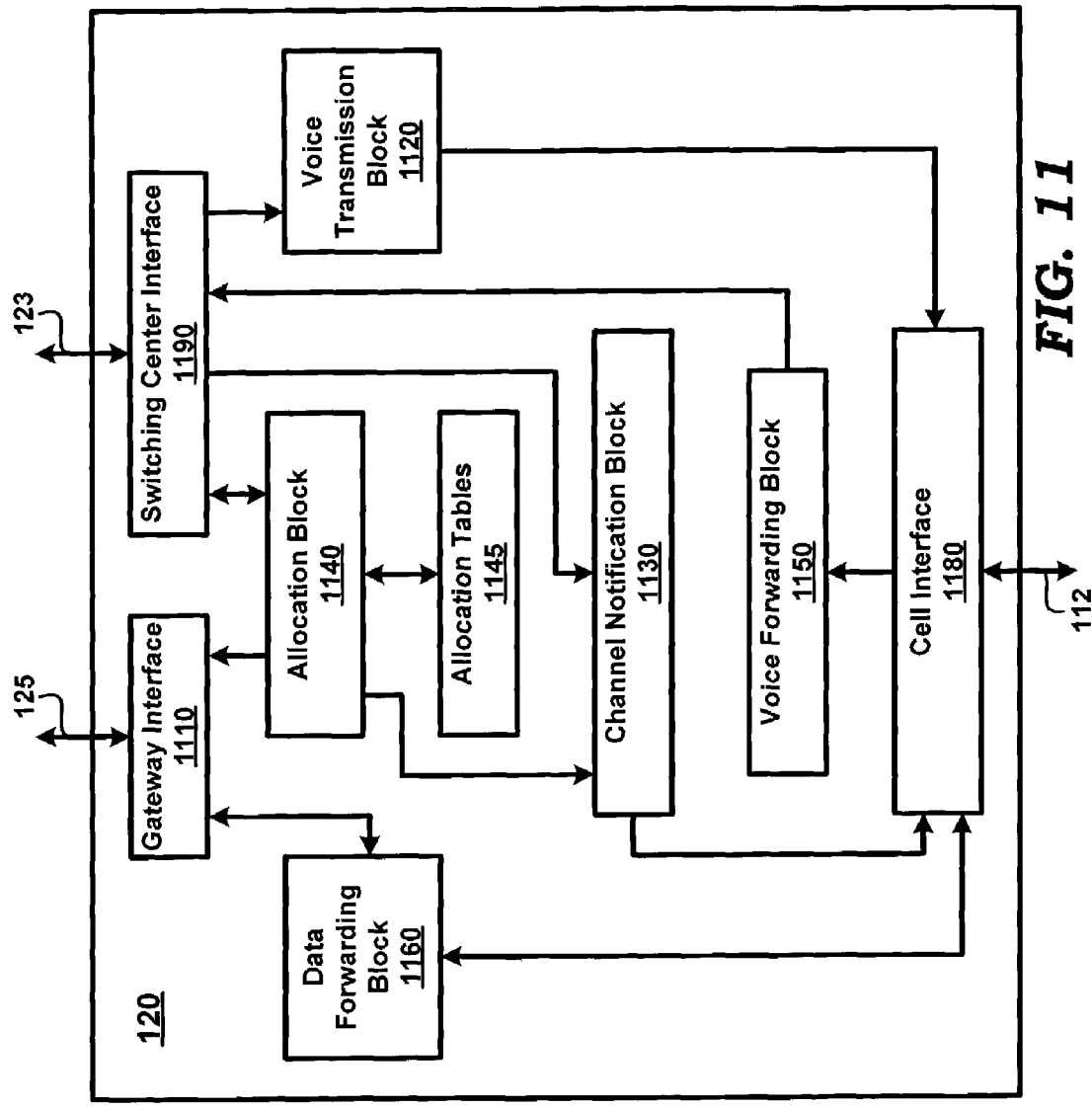
FIG. 11 is a block diagram illustrating the manner in which a base station may be implemented in an embodiment of the present invention.

FIG. 11 is a block diagram illustrating the details of an embodiment of base station 120 as relevant to several aspects of present invention. Base station 120 is shown containing gateway interface 1110, voice transmission block 1120, channel notification block 1130, allocation block 1140, allocation table 1145, voice forwarding block 1150, data forwarding block 1160, cell interface 1180, and switching interface 1190. Each block is described below in further detail.

Each of gateway interface 1110, cell interface 180 and switching center interface 1190 provide the electrical, physical and protocol interfaces necessary to communicate respectively with gateway 150, mobile nodes 115, and switching center 130. Cell interface 1180 examines each packet received on path 112 (from a transceiver, not shown), and forwards data and voice related cells to data forwarding block 1160 and voice forwarding block 1150 respectively.

Gateway interface 1110 forwards data packets received on path 125 to data forwarding block 1160. Switching interface 1190 forwards data related packets received on path 123 to data forwarding block 1160, and voice related packets to voice transmission block 1120. The three interfaces 1110, 1180 and 1190 may be implemented in a known way.

Voice transmission block 1120 receives (from switching interface 1190) voice data for transmission from switching center 130, and transmits the corresponding voice signal by interfacing with cell interface. Voice forwarding block 1150 forwards the voice data to switching interface 1190 for eventual forwarding to switching center 130. Voice forwarding block 1110 and voice transmission block 1120 may be implemented in a known way.

Channel notification block 1130 generates various notifications on cell-based wireless network 110 by interfacing with cell interface 1180. For example, in the initialization phase, channel notification block 1130 receives a membership query request, and causes a NCH packet broadcast which indicates that any mobile node may indicate multicast application of interest.

Similarly, while initiating the data transfer phase for a specific multicast application, channel notification block 1130 receives a channel identifier (identifying the specific channel for broadcasting the data for the multicast application) and a group identifier, and broadcasts the combination in a packet (e.g., NCH packet). Based on such a broadcast, mobile nodes may determine that the data for the specific multicast application will be available in a channel identified by the channel identifier.

Allocation block 1140 receives requests to allocate voice or data channels on cell-based wireless network 110, and allocates the corresponding channel. The channel identifier of the allocated channel is sent back to switching center 130 via Switching interface 1190. Allocation table 1145 is updated according to the allocation. When the allocation relates to a data channel for transferring data related to a multicast application, allocation block 1140 forwards the channel identifier of the allocated channel to channel notification block 1130.

Data forwarding block 1160 receives data portions and associated channel identifier. In an embodiment, each data portion and the channel identifier are received in the same packet, as described in sections above. Data forwarding block 1160 interfaces with cell interface 1180 to broadcast each data portion on a channel with the corresponding channel identifier. On the other hand, data received from cell interface 1180 is forwarded to gateway 150 using gateway interface 1110.

Thus, using the approaches described above multicast applications from data networks may be extended to mobile nodes in cell-based wireless networks.

26. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A communication system comprising:
 a cell-based wireless network containing a plurality of mobile nodes, said cell-based wireless network being designed to operate according to GSM (Global System for Mobile Communication) protocol;
 a data network containing a plurality of end machines, each of said plurality of end machines being a source of a corresponding multicast application;
 a BSS (base station system) transmitting packet data to and receiving packet data from said plurality of mobile nodes;
 a MSC (mobile switching center) coupled to said BSS, said MSC controlling allocation of channels on said cell-based wireless network by interfacing with said BSS;
 a SGSN (Serving GPRS Support Node) coupled to said BSS;
 a GGSN (Gateway GPRS Support Node) coupled to said SGSN and said data network, said GGSN to operate as a router attached to said data network, said GGSN receiving a list of multicast applications from said SGSN, each of said list of multicast applications being of interest at least to one of said plurality of mobile nodes, said GGSN forwarding data related to said list of multicast applications to said SGSN, wherein said SGSN forwards said data to said cell-based wireless network using said BSS such that each of said plurality of mobile nodes has access to corresponding multicast applications of interest.

2. The communication system of claim 1, wherein said GGSN notifies said SGSN of availability of multicasting capability, and said SGSN causes said BSS and said MSC to generate a poll notification to said plurality of mobile nodes, wherein each of said plurality of mobile nodes communicates with said SGSN to indicate any corresponding multicast applications of interest in response to receiving said poll notification.

3. The communication system of claim 2, wherein each of said multicast applications is identified by a class-D IP network address, wherein each of said multicast applications of interest is indicated by said class-D IP network address.

4. The communication system of claim 3, wherein said SGSN generates a group identifier associated with each of said multicast applications of interest, and sends said group identifier as identifying the corresponding multicast application when a mobile node indicates that the multicast application of interest.

5. The communication system of claim 4, wherein said SGSN sends a first request for allocation of a channel when data related to a first multicast application is available, wherein said SGSN sends a first group identifier in said first request, said first group identifier mapping to said first multicast application.

6. The communication system of claim 5, wherein said MSC receives said first request and sets up a first channel on said cell-based wireless network by interfacing with said BSS, said MSC further causing said BSS to broadcast on said cell-based wireless network a channel notification indicating that data related to said first multicast application will be transmitted on said first channel.

7. The communication system of claim 6, wherein said SGSN receives a first channel identifier of said first channel, and transmits data related to said first multicast application on said first channel.

8. A data switch extending access of multicast applications provided from a data network to a plurality of mobile nodes, said plurality of mobile nodes being located on a cell-based wireless network, said data switch comprising:

a memory storing a routing table;

a gateway interface receiving data from a gateway indicating a list of multicast applications of interest to said plurality of mobile nodes located in said cell-based wireless network;

an IP inbound interface and a multicast application block, said IP inbound interface receiving a plurality of IP packets including a plurality of multicast packets and a plurality of unicast packets, said IP inbound interface forwarding said plurality of multicast packets to said multicast application block, said multicast application block forwarding data related to said list of multicast applications to said gateway;

an IP outbound interface; and a unicast forwarding block transmitting said plurality of unicast packets using said IP outbound interface, wherein said multicast application block notifies said gateway of availability of multicasting capability, and receives said list in response to notifying said gateway of availability.

9. The data switch of claim 8, wherein said multicast application block is implemented according to GTP (GPRS Tunneling Protocol).

10. The data switch of claim 8, wherein said multicast application block periodically notifies said gateway of availability of multicasting capability.

11. The data switch of claim 8, said multicast application block receiving data from said gateway indicating another multicast application of interest to said plurality of mobile nodes, wherein said multicast application block forwards data related to said another multicast application also to said gateway such that one of said plurality of mobile nodes can dynamically join said another multicast application at any desired time.

12. A gateway for extending access of multicast applications provided from a data network to a plurality of mobile nodes, said plurality of mobile nodes being located on a cell-based wireless network, said gateway comprising:

a base station interface receiving data representing a corresponding multicast application of interest from each of said plurality of mobile nodes;

a multicast processor sending a single copy of data related to a first multicast application of interest for broadcast on said cell-based wireless network even if multiple mobile nodes are interested in said first multicast application, wherein said multiple mobile nodes are comprised in said plurality of mobile nodes; and a membership processing block sending an allocation request requesting allocation of a data channel on said cell-based wireless network, wherein said allocation request further contains a first identifier which uniquely identifies said first multicast application of interest, said membership processing block receiving a channel identifier identifying said data channel, wherein said multicast processor sends said channel identifier along with said single copy of data such that said single copy of data is broadcast on said data channel on said cell-based wireless network.

13. The gateway of claim 12, further comprising:

a memory containing a map/channel table indicating a channel identifier associated with each multicast application of interest;

a switching interface for interfacing with a switching center; and a channel setup block for setting up a data channel said each multicast application of interest, said channel setup block storing a corresponding channel identifier associated with each multicast application of interest.

14. The gateway of claim 12, wherein said membership processing block receives a notification of availability of multicasting capability from a data switch, determines a list of multicast applications of interest to said plurality of mobile nodes in response to receiving said notification.

15. The gateway of claim 14, wherein said membership processing block generates each of a plurality of group identifiers associated with a corresponding one of multicast applications of interest, wherein one of said plurality of group identifiers comprises said first identifier, said membership processing block sending a corresponding group identifier as a response when a mapping multicast application is indicated as being of interest.

16. The gateway of claim 15, wherein said cell-based wireless network is implemented using GSM standard.

17. A switching center for extending access of multicast applications to a plurality of mobile nodes, said multicast applications being provided from a data network, said plurality of mobile nodes being located on a cell-based wireless network, said switching center comprising:
  a gateway interface receiving a membership query requesting each of said plurality of mobile nodes to indicate any corresponding multicast applications of interest, said membership query being received from a gateway;
  a base station interface to interface with a base station; and
  a control block forwarding said membership query to said base station using said base station interface,
  wherein said control block receives a request to allocate a data channel from each of said plurality of mobile nodes if the corresponding mobile node is interested in at least one of a plurality of multicast applications of interest, wherein said request is generated by a corresponding mobile node in response to said membership query.

18. The switching center of claim 17, wherein said control block receives an another request to allocate another channel from said gateway, wherein said another request contains a unique identifier of a first multicast application for which data is available for broadcasting on said cell-based wireless network, wherein said control block forwards said another request to said base station using said base station interface.

19. The switching center of claim 18, wherein said cell-based wireless network is implemented using GSM standard.

20. The switching center of claim 19, wherein said base station interface communicates with said base station using BSSAP+, and wherein each of said request and said another request contain information elements according to BSSMAP.

21. A base station for extending access of multicast applications provided from a data network to a plurality of mobile nodes, said plurality of mobile nodes being located on a cell-based wireless network, said base station comprising:
  a gateway interface receiving a membership query request designed to cause each of said plurality of mobile nodes to indicate corresponding multicast application of interest;
  a cell interface interfacing with said cell-based wireless network; and
  a channel notification block coupled to said gateway interface, said channel notification block broadcasting said membership query request on said cell-based wireless network using said cell interface,
  wherein said cell interface receives a data packet from each of said plurality of mobile nodes indicating any multicast applications of interest in response to receiving said membership query request.

22. The base station of claim 21, wherein said gateway interface receives a first channel allocation request requesting allocation of a first data channel, a unique identifier identifying a first multicast application being received associated with said first channel allocation request, said base station further comprising an allocation block allocating said first data channel with a first channel identifier,
  said allocation block causing said channel notification block to broadcast a notification message on said cell-based wireless network, wherein said notification message contains said unique identifier and said first channel identifier.

23. The base station of claim 22, further comprising a data forwarding block receiving a plurality of data portions each associated with said first channel identifier, said data forwarding block determining that said plurality of data portions are to be broadcast on said first data channel based on said first channel identifier, said data forwarding block causing said cell interface to broadcast said plurality of data portions on said first channel.

24. The base station of claim 23, wherein said cell-based wireless network is implemented according to GSM standard, and wherein said membership query request and said first channel allocation request are received according to BSSMAP protocol.

25. The base station of claim 24, wherein said cell interface broadcasts said membership query request and said notification message on a notification channel (NCH) provided by said GSM standard.

26. A mobile node accessing multicast applications provided from data networks, said mobile node being contained in a cell-based wireless network, said mobile node comprising:
  a first interface interfacing with said cell-based wireless network; and
  a processing unit sending data on said cell-based wireless network representing a multicast application of interest, wherein said multicast application of interest originates in a data network outside of said cell-based wireless network, said first interface receiving data related to said multicast application of interest,
  wherein said cell-based wireless network supports a plurality of channels, wherein said first interface receives a channel notification indicating a first channel on which said data related to said multicast application will be received, wherein said data related to said multicast application is received on said first channel after said channel notification is received.

27. The mobile node of claim 26, wherein said data representing a multicast application of interest comprises a class-D IP address.

28. The mobile node of claim 27, wherein said processing unit receives a group identifier uniquely mapping to said class-D IP address, wherein said group identifier is shorter in length compared to a length of said class-D IP address.

29. The mobile node of claim 28, wherein said processing unit receives a poll notification indicating the availability of multicasting capability to said mobile node, wherein said mobile node sends data representing said multicast application of interest in response to said poll notification, said processing unit requesting a second channel to a SGSN causing said poll notification to be initiated and receiving indication of allocation of said second channel, wherein said data representing said multicast application of interest is sent on said second channel.

30. The mobile node of claim 29, wherein said cell-based wireless network is implemented using GSM (Global System for Mobile Communication).

31. The mobile node of claim 30, wherein said poll notification comprises a notification channel (NCH) with null channel description.

32. The mobile node of claim 31, wherein said channel notification is also comprised in said NCH.

33. A mobile node accessing multicast applications provided from data networks, said mobile node being contained in a cell-based wireless network, said mobile node comprising:
  means for receiving a poll notification indicating the availability of multicasting capability to said mobile node;
  means for sending data on said cell-based wireless network representing a multicast application of interest in response to said poll notification, wherein said multicast application of interest originates in a data network outside of said cell-based wireless network;

means for receiving data related to said multicast application of interest; and means for receiving a channel notification indicating a first channel on which said data related to said multicast application will be received, wherein said data related to said multicast application is received on said first channel after said channel notification is received.

34. The mobile node of claim 33, wherein said data representing a multicast application of interest comprises a class-D IP address.

35. The mobile node of claim 34, further comprising means for receiving a group identifier uniquely mapping to said class-D IP address, wherein said group identifier is shorter in length compared to a length of said class-D IP address.

36. The mobile node of claim 35, further comprising:

means for requesting a second channel to a SGSN causing said poll notification to be initiated; and means for receiving indication of allocation of said second channel, wherein said data representing said multicast application of interest is sent on said second channel.

37. The mobile node of claim 36, wherein said cell-based wireless network is implemented using GSM (Global System for Mobile Communication).

38. The mobile node of claim 37, wherein said poll notification comprises a notification channel (NCH) with null channel description.

39. The mobile node of claim 38, wherein said channel notification is also comprised in said NCH.

40. A data switch for extending access of multicast applications provided from a data network to a plurality of mobile nodes, said plurality of mobile nodes being located on a cell-based wireless network, said data switch being of a router type of Internet Protocol (IP) designed to route data related to multicast applications to mobile nodes operating as end machines of the corresponding multicast application, said data switch comprising:

means for receiving data from a gateway indicating a list of multicast applications of interest to said plurality of mobile nodes located in said cell-based wireless network;

means for forwarding data related to said list of multicast applications to said gateway; and means for receiving data from said gateway indicating another multicast application of interest to said plurality of mobile nodes, wherein said data switch forwards data related to said another multicast application also to said gateway such that one of said plurality of mobile nodes can dynamically join said another multicast application at any desired time.

41. The data switch of claim 40, further comprising means for notifying said gateway of availability of multicasting capability, wherein said means for receiving receives said list in response to said notifying.

42. The data switch of claim 41, wherein said means for receiving and said means for notifying operate according to using GTP (GPRS Tunneling Protocol).

43. The data switch of claim 41, wherein said means for notifying periodically notifies said gateway of availability of multicasting capability.

44. The data switch of claim 41, wherein said means for receiving receives data from said gateway indicating another multicast application of interest to said plurality of mobile nodes, wherein said means for receiving forwards data related to said another multicast application also to said gateway such that one of said plurality of mobile nodes can dynamically join said another multicast application at any desired time.

45. A gateway for extending access of multicast applications provided from a data network to a plurality of mobile nodes, said plurality of mobile nodes being located on a cell-based wireless network, said gateway comprising:

means for receiving data representing a corresponding multicast application of interest from each of said plurality of mobile nodes;

means for sending a single copy of data related to a first multicast application of interest for broadcast on said cell-based wireless network even if multiple mobile nodes are interested in said first multicast application, wherein said multiple mobile nodes are comprised in said plurality of mobile nodes, means for sending an allocation request requesting allocation of a data channel on said cell-based wireless network, wherein said allocation request further contains a first identifier which uniquely identifies said first multicast application of interest; and means for receiving a channel identifier identifying said data channel.

46. The gateway of claim 45, further comprising means for sending said channel identifier along with said single copy of data such that said single copy of data is broadcast on said data channel on said cell-based wireless network.

47. The gateway of claim 46, further comprising:

means for receiving a notification of availability of multicasting capability from a data switch; and means for determining a list of multicast applications of interest to said plurality of mobile nodes in response to receiving said notification, wherein said means for determining receives data representing a corresponding multicast application of interest.

48. The gateway of claim 47, further comprising:

means for generating each of a plurality of group identifiers associated with a corresponding one of multicast applications of interest, wherein one of said plurality of group identifiers comprises said first identifier; and means for sending a corresponding group identifier as a response when a mapping multicast application is indicated as being of interest.

49. The gateway of claim 48, wherein said cell-based wireless network is implemented using GSM standard.

50. A switching center for extending access of multicast applications provided from a data network to a plurality of mobile nodes, said plurality of mobile nodes being located on a cell-based wireless network, said switching center comprising:

means for receiving a single membership query requesting each of said plurality of mobile nodes to indicate any corresponding multicast applications of interest, wherein at least one mobile node is designed to indicate multiple applications of interest in response receiving said single membership query request;

means for forwarding said single membership query to a base station for transmission to said plurality of mobile nodes on said cell-based wireless network; and means for receiving a request to allocate a data channel from each of said plurality of mobile nodes if the corresponding mobile node is interested in at least one of a plurality of multicast applications of interest, wherein said request is generated in response to said membership query.

51. The switching center of claim 50, further comprising:

means for receiving an another request to allocate another channel from said gateway, wherein said another request contains a unique identifier of a first multicast application for which data is available for broadcasting on said cell-based wireless network; and means for forwarding said another request to said base station.

52. The switching center of claim 51, wherein said cell-based wireless network is implemented using GSM standard.

53. The switching center of claim 52, wherein said switching center communicates with said base station using BSSAP+, and wherein each of said request and said another request contain information elements according to BSSMAP.

54. A base station for extending access of multicast applications provided from a data network to a plurality of mobile nodes, said plurality of mobile nodes being located on a cell-based wireless network, said base station comprising:

means for receiving a single membership query request, wherein each of said plurality of mobile nodes indicate any multicast applications of interest in response to receiving said single membership query request, wherein at least one mobile node is designed to indicate multiple applications of interest in response receiving said single membership query request;

means for broadcasting said single membership query request on said cell-based wireless network;

means for receiving a first channel allocation request requesting allocation of a first data channel, a unique identifier identifying a first multicast application being received associated with said first channel allocation request;

means for allocating said first data channel with a first channel identifier; and means for broadcasting a notification message on said cell-based wireless network, wherein said notification message contains said unique identifier and said first channel identifier.

55. The base station of claim 54, further comprising:

means for receiving a plurality of data portions each associated with said first channel identifier;

means for determining that said plurality of data portions are to be broadcast on said first data channel based on said first channel identifier; and means for broadcasting said plurality of data portions on said first channel.

56. The base station of claim 55, wherein said cell-based wireless network is implemented according to GSM standard, and wherein said membership query request and said first channel allocation request are received according to BSSMAP protocol.

57. The base station of claim 56, wherein each of said membership query request and said notification message comprises a packet transmitted on a notification channel (NCH) provided by said GSM standard.

58. A mobile node for accessing multicast applications provided from data networks, said mobile node being contained in a cell-based wireless network, wherein said cell-based wireless network supports a plurality of channels, said mobile node comprising:

means for sending data on said cell-based wireless network representing a multicast application of interest, wherein said multicast application of interest originates in a data network outside of said cell-based wireless network;

means for receiving data related to said multicast application of interest; and means for receiving a channel notification indicating a first channel on which said data related to said multicast application will be received, wherein said data related to said multicast application is received on said first channel after said channel notification is received.

59. The mobile node of claim 58, wherein said data representing a multicast application of interest comprises a class-D IP address.

60. The mobile node of claim 59, further comprising means for receiving a group identifier uniquely mapping to said class-D IP address, wherein said group identifier is shorter in length compared to a length of said class-D IP address.

61. The mobile node of claim 60, further comprising:

means for receiving a poll notification indicating the availability of multicasting capability to said mobile node, wherein said mobile node sends data representing said multicast application of interest in response to said poll notification;

means for requesting a second channel to a SGSN causing said poll notification to be initiated; and means for receiving indication of allocation of said second channel, wherein said data representing said multicast application of interest is sent on said second channel.

62. The mobile node of claim 61, wherein said cell-based wireless network is implemented using GSM (Global System for Mobile Communication).

63. The mobile node of claim 62, wherein said poll notification comprises a notification channel (NCH) with null channel description.

64. The mobile node of claim 63, wherein said channel notification is also comprised in said NCH.

65. A computer readable medium carrying one or more sequences of instructions for causing a gateway to extend access of multicast applications provided from a data network to a plurality of mobile nodes, said plurality of mobile nodes being located on a cell-based wireless network, wherein execution of said one or more sequences of instructions by one or more processors contained in said gateway causes said one or more processors to perform the actions of:

receiving data representing a corresponding multicast application of interest from each of said plurality of mobile nodes;

sending a single copy of data related to a first multicast application of interest for broadcast on said cell-based wireless network even if multiple mobile nodes are interested in said first multicast application, wherein said multiple mobile nodes are comprised in said plurality of mobile nodes;

sending an allocation request requesting allocation of a data channel on said cell-based wireless network, wherein said allocation request further contains a first identifier which uniquely identifies said first multicast application of interest; and receiving a channel identifier identifying said data channel.

66. The machine readable medium claim 65, further comprising sending said channel identifier along with said single copy of data such that said single copy of data is broadcast on said data channel on said cell-based wireless network.

67. The machine readable medium of claim 66, further comprising:

receiving a notification of availability of multicasting capability from a data switch; and determining a list of multicast applications of interest to said plurality of mobile nodes in response to receiving said notification, wherein said determining comprises said receiving data representing a corresponding multicast application of interest.

68. The machine readable medium of claim 67, further comprising:

generating each of a plurality of group identifiers associated with a corresponding one of multicast applications of interest, wherein one of said plurality of group identifiers comprises said first identifier; and sending a corresponding group identifier as a response when a mapping multicast application is indicated as being of interest.

69. The machine readable medium of claim 68, wherein said cell-based wireless network is implemented using GSM standard.

70. A computer readable medium carrying one or more sequences of instructions for causing a switching center to extend access of multicast applications provided from a data network to a plurality of mobile nodes, said plurality of mobile nodes being located on a cell-based wireless network, wherein execution of said one or more sequences of instructions by one or more processors contained in said switching center causes said one or more processors to perform the actions of:

receiving a membership query requesting each of said plurality of mobile nodes to indicate any corresponding multicast applications of interest;

forwarding said membership query to a base station; and receiving a request to allocate a data channel from each of said plurality of mobile nodes if the corresponding mobile node is interested in at least one of a plurality of multicast applications of interest, wherein said request is generated in response to said membership query.

71. The machine readable medium of claim 70, further comprising:

receiving an another request to allocate another channel from said gateway, wherein said another request contains a unique identifier of a first multicast application for which data is available for broadcasting on said cell-based wireless network; and forwarding said another request to said base station.

72. The machine readable medium of claim 71, wherein said cell-based wireless network is implemented using GSM standard.

73. The machine readable medium of claim 72, wherein said switching center communicates with said base station using BSSAP+, and wherein each of said request and said another request contain information elements according to BSSMAP.

74. A computer readable medium carrying one or more sequences of instructions for causing a base station to extend access of multicast applications provided from a data network to a plurality of mobile nodes, said plurality of mobile nodes being located on a cell-based wireless network, wherein execution of said one or more sequences of instructions by one or more processors contained in said base station causes said one or more processors to perform the actions of:

receiving a single membership query request, wherein each of said plurality of mobile nodes indicate any multicast applications of interest in response to receiving said single membership query request; and broadcasting said single membership query request on said cell-based wireless network.

75. The machine readable medium of claim 74, further comprising:

receiving a first channel allocation request requesting allocation of a first data channel, a unique identifier identifying a first multicast application being received associated with said first channel allocation request;

allocating said first data channel with a first channel identifier;

broadcasting a notification message on said cell-based wireless network, wherein said notification message contains said unique identifier and said first channel identifier.

76. The machine readable medium of claim 75, further comprising:

receiving a plurality of data portions each associated with said first channel identifier;

determining that said plurality of data portions are to be broadcast on said first data channel based on said first channel identifier; and broadcasting said plurality of data portions on said first channel.

77. The machine readable medium of claim 76, wherein said cell-based wireless network is implemented according to GSM standard, and wherein said membership query request and said first channel allocation request are received according to BSSMAP protocol.

78. The machine readable medium of claim 77, wherein each of said broadcasting said membership query request and said broadcasting a notification message comprises transmitting a packet on a notification channel (NCH) provided by said GSM standard.

79. A computer readable medium carrying one or more sequences of instructions for enabling a mobile node to access multicast applications provided from data networks, said mobile node being contained in a cell-based wireless network, wherein said cell-based wireless network supports a plurality of channels, wherein execution of said one or more sequences of instructions by one or more processors contained in said mobile node causes said one or more processors to perform the actions of:

receiving a poll notification indicating the availability of multicasting capability to said mobile node;

sending data on said cell-based wireless network representing a multicast application of interest in response to said poll notification, wherein said multicast application of interest originates in a data network outside of said cell-based wireless network;

receiving a channel notification indicating a first channel on which said data related to said multicast application will be received; and receiving data related to said multicast application of interest, wherein said data related to said multicast application is received on said first channel after said channel notification is received.

80. The machine readable medium of claim 79, wherein said data representing a multicast application of interest comprises a class-D IP address.

81. The machine readable medium of claim 80, further comprising receiving a group identifier uniquely mapping to said class-D IP address, wherein said group identifier is shorter in length compared to a length of said class-D IP address.

82. The machine readable medium of claim 81, further comprising:

requesting a second channel to a SGSN causing said poll notification to be initiated; and receiving indication of allocation of said second channel, wherein said data representing said multicast application of interest is sent on said second channel.

83. The machine readable medium of claim 82, wherein said cell-based wireless network is implemented using GSM (Global System for Mobile Communication).

84. The machine readable medium of claim 82, wherein said poll notification comprises a notification channel (NCH) with null channel description.

85. The machine readable medium of claim 84, wherein said channel notification is also comprised in said NCH.

86. A computer readable medium carrying one or more sequences of instructions for causing a data switch to allow access of multicast applications provided from a data network to a plurality of mobile nodes, said plurality of mobile nodes being located on a cell-based wireless network, wherein execution of said one or more sequences of instructions by one or more processors contained in said data switch causes said one or more processors to perform the actions of:
   receiving data from a gateway indicating a list of multicast applications of interest to said plurality of mobile nodes located in said cell-based wireless network;
   forwarding data related to said list of multicast applications to said gateway;
   receiving data from said gateway indicating another multicast application of interest to said plurality of mobile nodes; and
   forwarding data related to said another multicast application also to said gateway such that one of said plurality of mobile nodes can dynamically join said another multicast application at any desired time.

87. The machine readable medium of claim 86, further comprising notifying said gateway of availability of multicasting capability, and receiving said list in response to said notifying.

88. The machine readable medium of claim 87, wherein said receiving and said notifying are performed using GTP (GPRS Tunneling Protocol).

89. The machine readable medium of claim 87, further comprising periodically notifying said gateway of availability of multicasting capability.

90. A method of allowing access of multicast applications provided from a data network to a plurality of mobile nodes, said plurality of mobile nodes being located on a cell-based wireless network, said method being implemented in a gateway, said method comprising:
   receiving data representing a corresponding multicast application of interest from each of said plurality of mobile nodes;
   sending a single copy of data related to a first multicast application of interest for broadcast on said cell-based wireless network even if multiple mobile nodes are interested in said first multicast application, wherein said multiple mobile nodes are comprised in said plurality of mobile nodes;
   sending an allocation request requesting allocation of a data channel on said cell-based wireless network, wherein said allocation request further contains a first identifier which uniquely identifies said first multicast application of interest; and
   receiving a channel identifier identifying said data channel.

91. The method of claim 90, further comprising sending said channel identifier along with said single copy of data such that said single copy of data is broadcast on said data channel on said cell-based wireless network.

92. The method of claim 91, further comprising:
   receiving a notification of availability of multicasting capability from a data switch; and
   determining a list of multicast applications of interest to said plurality of mobile nodes in response to receiving said notification, wherein said determining comprises said receiving data representing a corresponding multicast application of interest.

93. The method of claim 92, further comprising:
   generating each of a plurality of group identifiers associated with a corresponding one of multicast applications of interest, wherein one of said plurality of group identifiers comprises said first identifier; and
   sending a corresponding group identifier as a response when a mapping multicast application is indicated as being of interest.

94. The method of claim 93, wherein said cell-based wireless network is implemented using GSM standard.

95. A method of extending access of multicast applications provided from a data network to a plurality of mobile nodes, said plurality of mobile nodes being located on a cell-based wireless network, said method being implemented in a switching center, said method comprising:
   receiving a single membership query requesting each of said plurality of mobile nodes to indicate any corresponding multicast applications of interest;
   forwarding said single membership query to a base station; and
   receiving a request to allocate a data channel from each of said plurality of mobile nodes if the corresponding mobile node is interested in at least one of a plurality of multicast applications of interest, wherein said request is generated in response to said membership query.

96. The method of claim 95, further comprising:
   receiving an another request to allocate another channel from said gateway, wherein said another request contains a unique identifier of a first multicast application for which data is available for broadcasting on said cell-based wireless network; and
   forwarding said another request to said base station.

97. The method of claim 96, wherein said cell-based wireless network is implemented using GSM standard.

98. The method of claim 97, wherein said switching center communicates with said base station using BSSAP+, and wherein each of said request and said another request contain information elements according to BSSMAP.

99. A method of extending access of multicast applications provided from a data network to a plurality of mobile nodes, said plurality of mobile nodes being located on a cell-based wireless network, said method being implemented in a base station, said method comprising:
   receiving a single membership query request, wherein the single membership query is designed to cause each of said plurality of mobile nodes to indicate any corresponding multicast applications of interest in response to receiving said single membership query request;
   broadcasting said single membership query request on said cell-based wireless network;
   receiving a first channel allocation request requesting allocation of a first data channel, a unique identifier identifying a first multicast application being received associated with said first channel allocation request;
   allocating said first data channel with a first channel identifier; and
   broadcasting a notification message on said cell-based wireless network, wherein said notification message contains said unique identifier and said first channel identifier.

100. The method of claim 99, further comprising:
   receiving a plurality of data portions each associated with said first channel identifier;
   determining that said plurality of data portions are to be broadcast on said first data channel based on said first channel identifier; and
   broadcasting said plurality of data portions on said first channel.

101. The method of claim 100, wherein said cell-based wireless network is implemented according to GSM standard, and wherein said membership query request and said first channel allocation request are received according to BSSMAP protocol.

102. The method of claim 101, wherein each of said broadcasting said membership query request and said broadcasting a notification message comprises transmitting a packet on a notification channel (NCH) provided by said GSM standard.

103. A method of extending access of multicast applications provided from data networks to a mobile node contained in a cell-based wireless network, wherein said cell-based wireless network supports a plurality of channels, said method being implemented in said mobile node, said method comprising:
    receiving a poll notification indicating the availability of multicasting capability to said mobile node;
    sending data on said cell-based wireless network representing a multicast application of interest in response to receiving said poll notification, wherein said multicast application of interest originates in a data network outside of said cell-based wireless network;
    receiving a channel notification indicating a first channel on which said data related to said multicast application will be received; and
    receiving data related to said multicast application of interest, wherein said data related to said multicast application is received on said first channel after said channel notification is received.

104. The method of claim 103, wherein said data representing a multicast application of interest comprises a class-D IP address.

105. The method of claim 104, further comprising receiving a group identifier uniquely mapping to said class-D IP address, wherein said group identifier is shorter in length compared to a length of said class-D IP address.

106. The method of claim 105, further comprising:
    requesting a second channel to a SGSN causing said poll notification to be initiated; and
    receiving indication of allocation of said second channel, wherein said data representing said multicast application of interest is sent on said second channel.

107. The method of claim 106, wherein said cell-based wireless network is implemented using GSM (Global System for Mobile Communication).

108. The method of claim 107, wherein said poll notification comprises a notification channel (NCH) with null channel description.

109. The method of claim 108, wherein said channel notification is also comprised in said NCH.

110. A method of extending access of multicast applications provided from a data network to a plurality of mobile nodes, said plurality of mobile nodes being located on a cell-based wireless network, said method being implemented in a data switch coupled to said data network, said method comprising:
    receiving data from a gateway indicating a list of multicast applications of interest to said plurality of mobile nodes located in said cell-based wireless network;
    operating as a router to receive data related to each of said list of multicast applications;
    forwarding data related to said list of multicast applications to said gateway; and
    receiving data from said gateway indicating another multicast application of interest to said plurality of mobile nodes, wherein said data switch forwards data related to said another multicast application also to said gateway such that one of said plurality of mobile nodes can dynamically join said another multicast application at any desired time.

111. The method of claim 110, further comprising notifying said gateway of availability of multicasting capability, and receiving said list in response to said notifying.

112. The method of claim 111, wherein said receiving and said notifying are performed using GTP (GPRS Tunneling Protocol).

113. The method of claim 111, further comprising periodically notifying said gateway of availability of multicasting capability.

* * * * *

UNITED STATES PATENT AND TRADEMARK OFFICE
CERTIFICATE OF CORRECTION

PATENT NO. : 7,633,926 B1 Page 1 of 1
APPLICATION NO. : 10/359187
DATED : December 15, 2009
INVENTOR(S) : Sethi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1759 days.

Signed and Sealed this

Twenty-first Day of December, 2010

David J. Kappos
*Director of the United States Patent and Trademark Office*